US005771068A

United States Patent [19]
Sali et al.

[11] Patent Number: 5,771,068
[45] Date of Patent: Jun. 23, 1998

[54] APPARATUS AND METHOD FOR DISPLAY PANEL INSPECTION

[75] Inventors: Erez Sali, Yehud; Yigal Katzir, Rishon Lezion; Noam Dotan, Givatayim; Abraham Gross, Rehovot, all of Israel

[73] Assignee: Orbotech Ltd., Yavne, Israel

[21] Appl. No.: 402,141

[22] Filed: Mar. 10, 1995

[30] Foreign Application Priority Data

Mar. 14, 1994 [IL] Israel ......................................... 108974

[51] Int. Cl.$^6$ ....................................................... G09G 3/36
[52] U.S. Cl. ................................................................. 348/92
[58] Field of Search ............................ 348/92, 189, 190, 348/191; 345/38, 44; 356/237; 359/40

[56] References Cited

U.S. PATENT DOCUMENTS

| | | | |
|---|---|---|---|
| 4,796,090 | 1/1989 | Fraiser | 348/147 |
| 5,012,314 | 4/1991 | Tobita et al. | 357/23.12 |
| 5,020,116 | 5/1991 | Macaulay | 348/190 |
| 5,081,687 | 1/1992 | Henley et al. . | |
| 5,177,437 | 1/1993 | Henly | 324/158 |
| 5,235,272 | 8/1993 | Henley | 445/904 |
| 5,245,328 | 9/1993 | Garrett | 345/149 |
| 5,402,170 | 3/1995 | Parulski et al. | 348/211 |

FOREIGN PATENT DOCUMENTS

| | | |
|---|---|---|
| 482564 | 4/1992 | European Pat. Off. . |
| 4133088 | 5/1992 | Japan . |
| 93/19453 | 9/1993 | WIPO . |

OTHER PUBLICATIONS

O'Shea & O'Connor, "Automatic Quality Control Inspection of Liquid Crystal Displays". SPIE vol. 2064 pp. 289–299.

Kelly, Shawn: "Removing the Pixel Structure From Projected Images Using a Transparent Spatial filter". SPIE vol. 1664 High Resolution Displays and Projection Systems. pp. 153–159.

Cummins, et al., "Evaluating Image Quality and Defect Characterization In Flat–Panel Displays".

"FIS Flat Panel Inspection System" Brochure published by Photon Dynamics, Inc.

Replace Human Eyes With The In–Line AOI For Final Cell Stage.

Japanese Patent Information Organization Abstract, JP 4133088, May 7, 1992.

Patent Abstracts of Japan, vol. 18, No. 642 (P–1838) 6 Dec. 1994 & JP–A–06 250 139 (Casio Comput Co Ltd Et Al.) 9 Sep. 1994.

Patent Abstracts of Japan, vol. 18, No. 621 (P–1838) 25 Nov. 1994 & JP–A–06 236 162 (Sharp Co) 23 Aug. 1994.

Patent Abstracts of Japan, vol. 18, No. 614 (P–1830) 22 Nov. 1994 & JP–A–06 230 744 (Fuji Electric Co Ltd) 19 Aug. 1994.

Primary Examiner—Thai Tran
Assistant Examiner—Huy Nguyen
Attorney, Agent, or Firm—Ladas & Parry

[57] ABSTRACT

A system for inspecting a display panel including a plurality of pixels, the system including a selective pixel actuator which causes only some of the plurality of pixels to be actuated, a sensor for acquiring an image of a pattern which is generated on the panel, and an image processor operative to identify nonuniformities in the intensities of pixels of the panel.

14 Claims, 5 Drawing Sheets

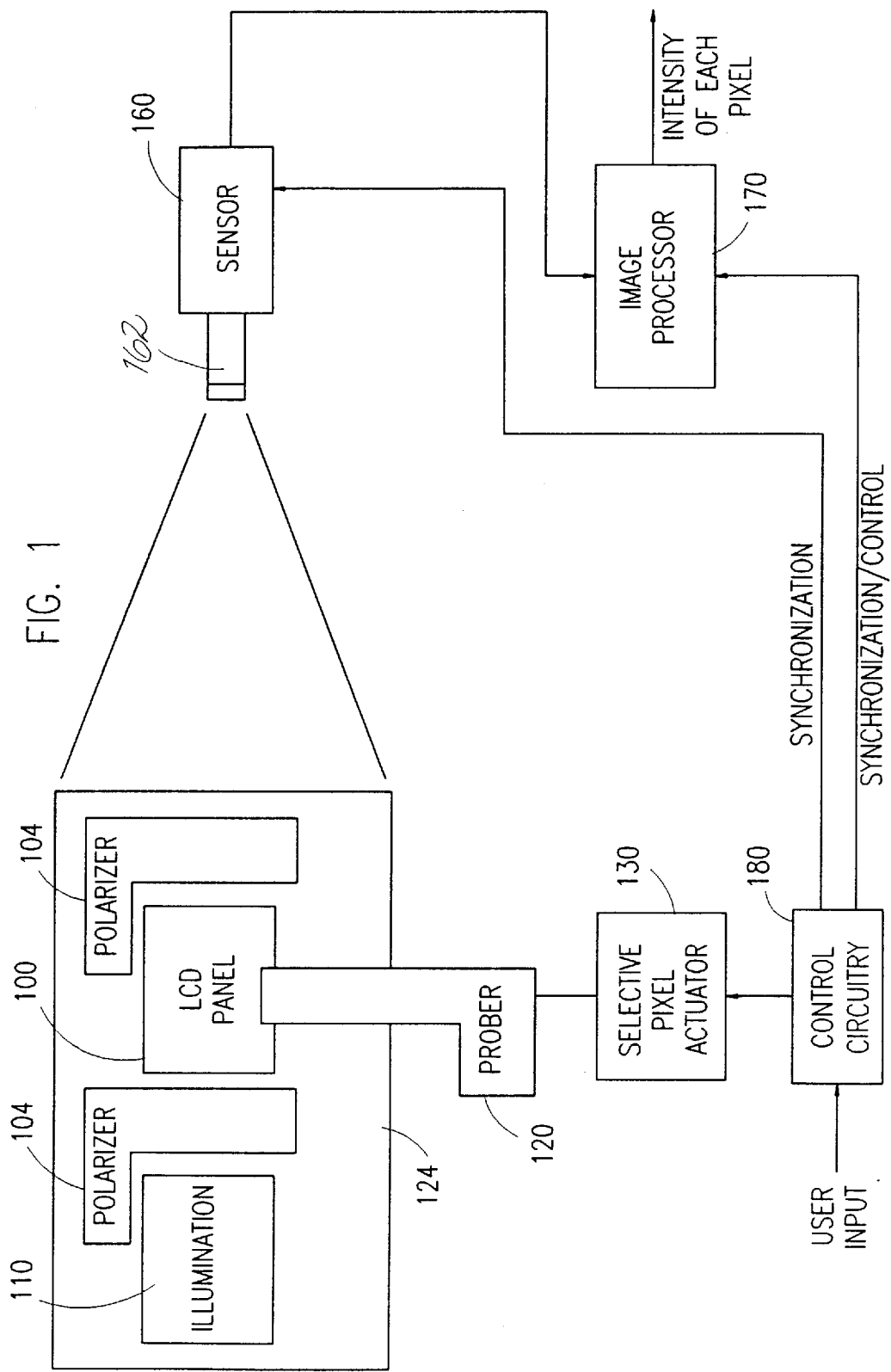

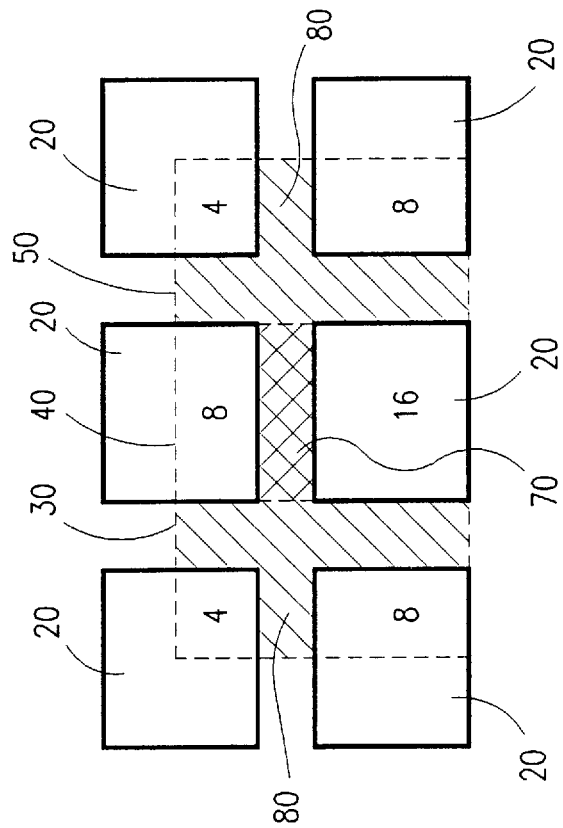
FIG. BA-2
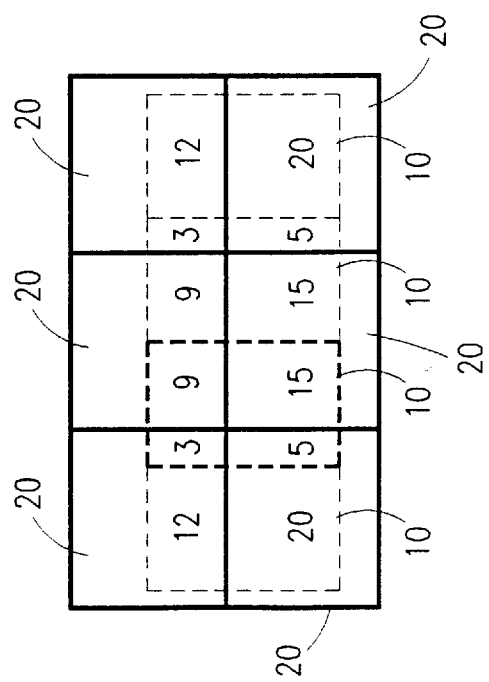
FIG. BA-1

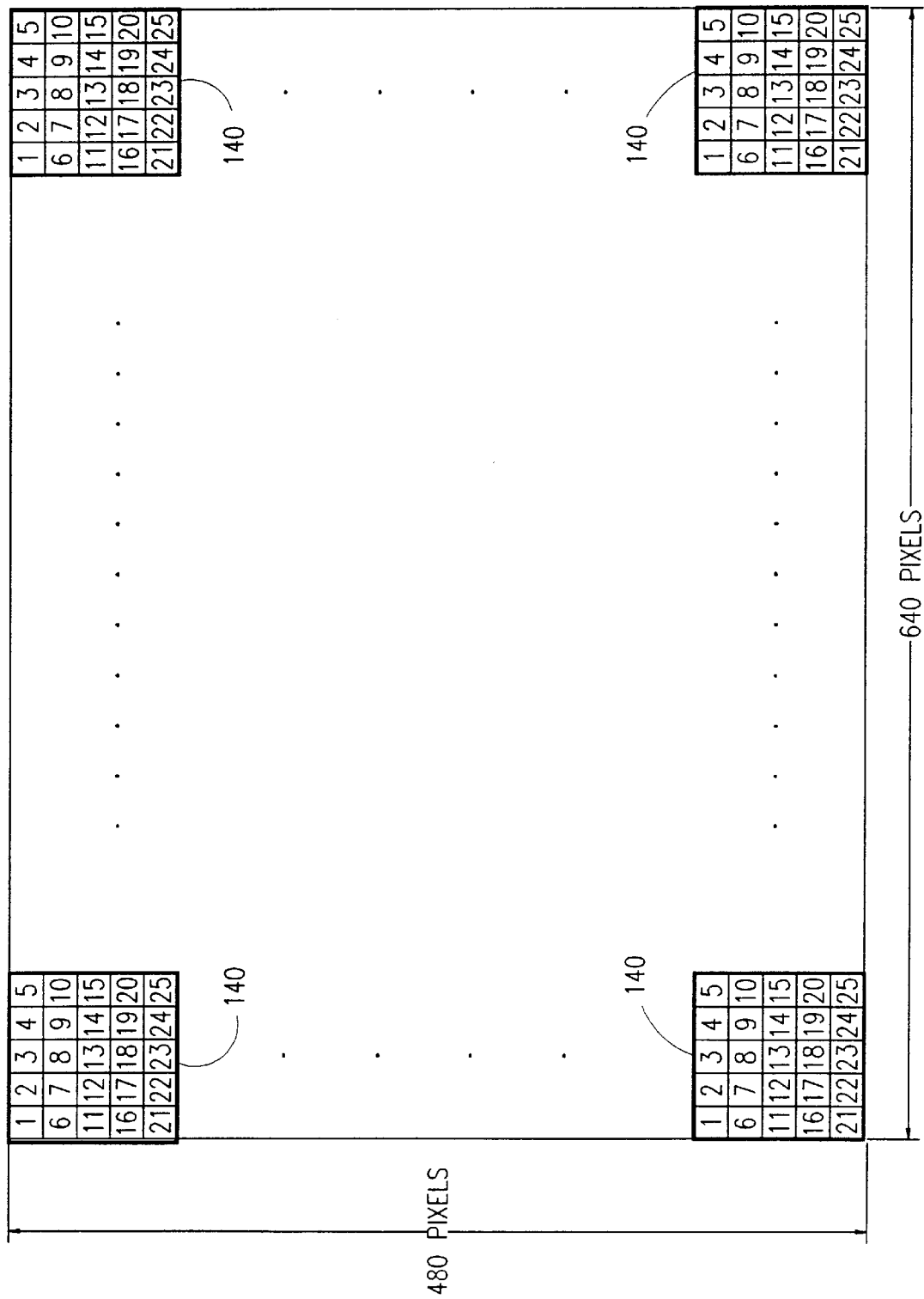

APPARATUS AND METHOD FOR DISPLAY PANEL INSPECTION

FIELD OF THE INVENTION

The present invention relates to display panel inspection.

BACKGROUND OF THE INVENTION

Conventional systems for inspecting display panels include the system described in Cummins, R. et al, "Evaluating image quality and defect characterization in flat panel display", Photon Dynamics, Inc., 1504 McCarthy Blvd., Milpitas, Calif., USA.

In conventional display panel inspection, an image of a display panel, including a multiplicity of pixels, is imaged by a sensor which is also pixelated, the pixels of the sensor normally not being contiguous (i.e., having a fill factor of less than 100%) and normally not being equally sized nor perfectly aligned relative to the pixels of the display panel image.

FIG. BA-1 is a diagram of a display panel image including, for simplicity, four display panel pixels 10 which are imaged by a sensor including, for simplicity, six sensing elements 20. The sensor is ideal, i.e. theoretical, in the sense that the sensor elements thereof are contiguous. Typically, nonuniform display panel intensity shows up as a local variation in the video signal of the sensors. The numbers within the display panel pixels 10 indicate the proportion of the total area of the display panel pixel that is sensed by the respective camera pixel, in arbitrary units.

FIG. BA-2 is a diagram of a display panel image which is not ideal in that the sensor elements 20 are not contiguous. In FIG. BA-2, for simplicity, three display panel pixels 30, 40 and 50 are shown. The portion of display panel pixel 40 which is not sensed, as indicated by cross-hatching 70 is smaller than the portions of display panels 30 and 50, as indicated by diagonal lines 80. This results in inaccuracies in measuring the intensities of the display panel pixels. Specifically, local variation in the video signal of the sensors does not necessarily indicate nonuniform display panel intensity.

SUMMARY OF THE INVENTION

The present invention seeks to provide an improved system for display panel inspection.

There is thus provided in accordance with a preferred embodiment of the present invention a system for inspecting a display panel including a plurality of pixels, the system including a selective pixel actuator which causes only some of the plurality of pixels to be actuated, a sensor for acquiring an image of a pattern which is generated on the panel, and an image processor operative to identify nonuniformities in the intensities of pixels of the panel.

Further in accordance with a preferred embodiment of the present invention the display panel includes an LCD (liquid crystal display) panel, and the system also includes an illuminator operative to provide illumination to a panel to be inspected.

Still further in accordance with a preferred embodiment of the present invention the illumination of the panel to be inspected includes back illumination and actuation of pixels includes changing the local transmittance thereof.

Additionally in accordance with a preferred embodiment of the present invention the selective pixel actuator is operative to sequentially actuate a sequence of pixel subsets, and each pixel subset includes only a single pixel within each of a plurality of pixel vicinities of predetermined size within the display panel.

There is further provided in accordance with a preferred embodiment of the present invention a system for inspecting a display panel including a plurality of pixels, the system including a sensor for simultaneously acquiring an image of substantially the entirety of a pattern which is generated on the panel, and an image processor operative to identify nonuniformities in the intensities of pixels of the panel.

There is additionally provided in accordance with a preferred embodiment of the present invention a method for inspecting a display panel including a plurality of pixels, the method including actuating only some of the plurality of pixels, acquiring an image of a pattern which is generated on the panel, and identifying nonuniformities in the intensities of pixels of the panel.

There is further provided in accordance with a preferred embodiment of the present invention a system for inspecting a display panel including a plurality of pixels, the system including a sensor for acquiring an image of a pattern which is generated on the panel at a resolution which does not substantially exceed that of a standard TV camera, and an image processor operative to identify nonuniformities in the intensities of pixels of the panel.

Further in accordance with a preferred embodiment of the present invention the sensor includes less than 1300×1000 sensing elements.

Still further in accordance with a preferred embodiment of the present invention the sensor includes no more than 800×500 sensing elements.

There is additionally provided in accordance with a preferred embodiment of the present invention a system for inspecting a display panel including a plurality of pixels, the system including a sensor for acquiring an image of a pattern which is generated on the panel, and an image processor operative to identify the intensity of each pixel of the panel.

Further in accordance with a preferred embodiment of the present invention the display panel includes a liquid crystal display (LCD) panel.

Still further in accordance with a preferred embodiment of the present invention the display panel includes an LCD cell without illumination, driver or polarizer.

Additionally in accordance with a preferred embodiment of the present invention the system also includes a fixture for holding the panel to be inspected.

There is also provided in accordance with a preferred embodiment of the present invention a method for inspecting a display panel including a plurality of pixels, the method including simultaneously acquiring an image of substantially the entirety of a pattern which is generated on the panel, and identifying nonuniformities in the intensities of pixels of the panel.

There is further provided in accordance with a preferred embodiment of the present invention a method for inspecting a display panel including a plurality of pixels, the method including acquiring an image of a pattern which is generated on the panel at a resolution which does not substantially exceed that of a standard TV camera, and identifying nonuniformities in the intensities of pixels of the panel.

Still further provided in accordance with a preferred embodiment of the present invention is a method for inspecting a display panel including a plurality of pixels, the method including acquiring an image of a pattern which is generated on the panel, and identifying the intensity of each pixel of the panel.

BRIEF DESCRIPTION OF THE DRAWINGS

The present invention will be understood and appreciated from the following detailed description, taken in conjunction with the drawings in which:

FIG. BA-1 is a diagram of a display panel image which is ideal in that the sensor elements are contiguous;

Figure 3:
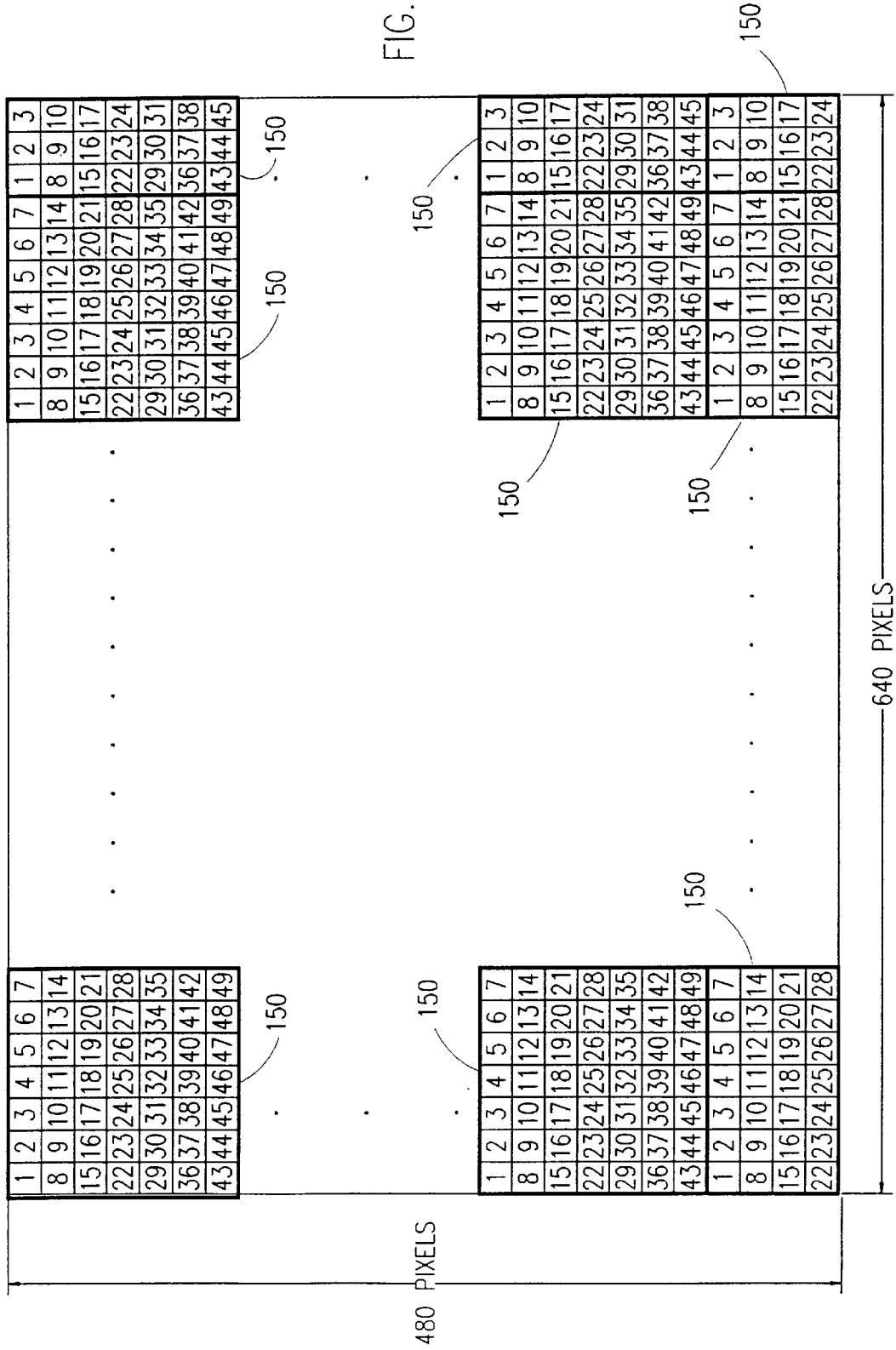
Figure 4:
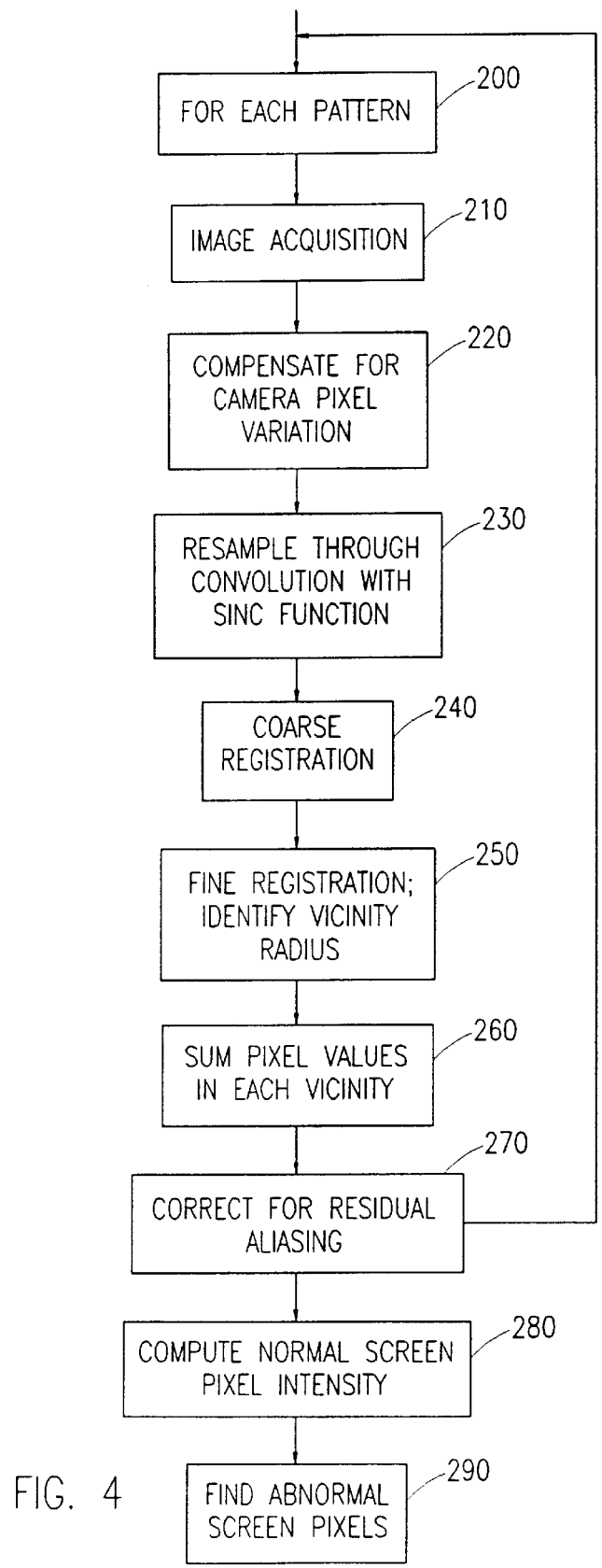

FIG. BA-2 is a diagram of a display panel image which is not ideal in that the sensor elements are not contiguous;

FIG. 1 is a functional block diagram of a display panel inspection system inspecting an LCD cell;

FIG. 2 is a diagram of one possible display panel pixel actuation ordering based on vicinities of 5×5 pixels each;

FIG. 3 is a diagram of another possible display panel pixel actuation ordering based on vicinities of 7×7 pixels each; and FIG. 4 is a simplified flowchart of a preferred image processing method for identifying the intensity of each pixel of the inspected display panel which is suitable for implementing the image processor of FIG. 1.

Attached herewith are the following appendices which aid in the understanding and appreciation of preferred embodiments of the invention shown and described herein:

Appendix A is a computer listing of a makefile for a preferred program which runs on a workstation and performs the functions of FIG. 3.

Appendices B–O are subroutines, termed GRAB_GLOBALS, GRAB_PACKAGE, GRABCENTER, REMOTE, DEMO, RESAMPLE, CC_LINK, SCAN_FILES, SCAN_IF, SCAN_TEXT, OPTIONS, PIC_IO, GRAB and IMIO, respectively, which are called by the program of the executable file generated by the makefile of Appendix A.

Appendix P is a computer listing of a preferred software implementation of selective pixel actuator 130 of FIG. 1.

DETAILED DESCRIPTION OF PREFERRED EMBODIMENTS

Reference is now made to FIG. 1 which is a functional block diagram of a display panel inspection system inspecting an LCD cell 100.

Since the unit under inspection is an LCD cell, polarizers 104 are provided as well as back illumination 110 and a prober 120 which is operative to provide electrical contacts with the inspected panel 100. A suitable fixture 124 maintains the LCD panel 100, polarizers 104 and illuminator 110 in mutually fixed association.

It is appreciated that substantially the same system may be employed to inspect an LCD module and/or a light emitting display panel. If an LCD module is inspected, the polarizers 104, back illumination 110 and prober 120 may be eliminated.

In the present specification, "LCD cell" is used to refer to a display panel without backlight, driver or polarizer whereas "LCD module" is used to refer to a fully assembled display panel.

The prober 120 is operative to provide electrical communication between LCD panel 100 and a selective pixel actuator 130. The selective pixel actuator 130 is operative to cause only some of the plurality of pixels which together form the display panel 100, to be actuated at one time. For LCD panels, actuation of pixels comprises changing of the local transmittance thereof. For light emitting panels, actuation of pixels comprises changing the amount of light emitted by the pixels.

Preferably, the selective pixel actuator 130 is operative to sequentially actuate a sequence of pixel subsets, wherein each pixel subset includes only a single pixel within each of a plurality of pixel vicinities of predetermined size within the display panel.

The simplest selective pixel actuation scheme is one in which, when a particular pixel is illuminated, none of its 8-connected neighbors are illuminated. Other pixel actuation schemes based on more complex pixel actuation orderings are illustrated in FIGS. 2 and 3.

FIG. 2 is a diagram of a display panel pixel actuation ordering which is based on vicinities, referenced 140, of 5×5 pixels each. The ordering of the pixels as 1, 2, ... , 25 means that the sequence of actuation thereof is as follows:

STEP 1: All pixels marked "1" are activated, thereby generating a first pattern on the screen;

STEP 2: All pixels marked "2" are activated, thereby generating a second pattern on the screen;

. . .

STEP 25: All pixels marked "25" are activated, thereby generating a twenty-fifth pattern on the screen.

FIG. 3 is a diagram of another display panel pixel actuation ordering which is based on vicinities, referenced 150, of 7×7 pixels each. The ordering of the pixels as 1, 2, ... , 49 means that the sequence of actuation thereof is as follows:

STEP 1: All pixels marked "1" are activated;

STEP 2: All pixels marked "2" are activated;

. . .

STEP 49: All pixels marked "49" are activated.

This ordering results in the sequential generation of 49 different patterns on the screen.

The size of each vicinity is typically selected as a compromise between the following two conflicting considerations:

a. A large vicinity makes the system more accurate; and b. A small vicinity makes the system quicker because less steps are required in order to sequentially inspect all pixels within the vicinity.

The area of the vicinity generally depends on the point spread function of the system, i.e. the extent to which the image of the display pixels captured by the system's sensor is blurred.

Preferably, the sequence of 25 or 49 patterns is preceded by a registration pattern which is employed not to determine the intensities of the screen pixels participating in any particular pattern but rather to determine the registration of all patterns in the sequence, relative to the pixels of sensor 160. Typically, the registration pattern comprises four screen pixels disposed adjacent the four corners of the screen.

The time interval between switching off of a pattern n and switching on of a pattern n+1 in each sequence and between the instant at which image acquisition of pattern n+1 can begin depends on the rise time and fall time characterizing the particular display technology. For example, for the active matrix LCD installed in the IBM ThinkPad 750C, acquisition may begin when the later of the following two events occurs:

a. The previous pattern n, has decayed sufficiently, e.g. to below 2% of its "on" intensity; and b. The current pattern n+1 has risen sufficiently, i.e. to above 98% of its "on" intensity.

The rise and fall times can be measured by a suitable photodetector such as a PMT (photomultiplier tube).

Preferably, predetermined blurring of the pattern is introduced in the image acquired by the system's sensor, in order to increase accuracy by allowing more sensing elements to participate in a local sensing task. Blurring may be achieved by means of a mechanical displacing unit which may be operative to vibrate or otherwise displace the display panel, and/or the sensor and/or an optical element such as a prism or mirror interposed between the display panel and the sensor. Alternatively or in addition, blurring may be achieved optically, as by means of a blurring filter 162 on the camera.

Referring back to FIG. 1, the system includes a sensor 160 such as a Cohu 4110 digital camera (commercially available from Cohu, San Diego, Calif., USA) equipped with a 25 mm lens. The lens is selected so as to simultaneously acquire an image of substantially the entire pattern generated on the panel, i.e. the entire area of the display panel 100, or almost the entire area thereof, is simultaneously imaged by the sensor 160.

The lens focal length is preferably selected such that a display panel having a typical diagonal of 10 inches is viewed at a distance of nearly 90 cm. This selection minimizes variation of display pixel intensity due to observation angle.

The resolution at which the sensor 160 acquires the image preferably does not substantially exceed that of a standard TV camera. The sensor preferably comprises less than 1300×1000 sensing elements, or even less than 800×500 sensing elements. For example, the Cohu camera includes 739×484 active sensing elements.

The digital video signal generated by the sensor 160, typically having a width of 8 bits, is fed to an image processor 170. Control circuitry 180 is operative to accept user input commands and programs and to control all system components. Control circuitry 180 and image processor 170 may, if desired, be implemented within a single unit such as a SPARC 10 workstation, commercially available from Sun Microsystems, Mountain View, Calif., USA, in conjunction with a MAX VIDEO 20 image processor, commercially available from Datacube, Danvers, Mass., USA.

FIG. 4 is a simplified flowchart of a preferred method of operation for the image processor 170 of FIG. 1. The method of FIG. 4 is preferably operative to identify the intensity of each pixel of the inspected display panel by processing each pattern generated on the display panel and comparing the different patterns generated on the display panel.

The method of FIG. 4 preferably includes the following steps:

a. STEP 200: Steps 210 to 270 are performed for each of the patterns generated on the display panel, such as 25 patterns or 49 patterns.

b. STEP 210: Receive the current pattern in digitized form from the sensor 160. To improve the signal-to-noise ratio, it is preferable to integrate the pattern's signal over several video frames, such as four video frames.

C. STEP 220: Compensate for performance variations among the camera pixels, for example by subtracting from each camera pixel value its offset value and subsequently multiplying each subtracted pixel value by its gain coefficient.

Preferably, the operational stage of the apparatus of FIG. 1 is preceded by a camera learning stage in which the offset values and gain coefficients are determined for each of the camera pixels.

d. STEP 230: The gray level image of the screen pattern is resampled through convolution with a sinc function, thereby to generate a new pattern whose resolution is typically greater than that of the original pattern. For example, the resolution may be increased fourfold. Resampling through convolution with a sinc function, which is particularly useful in overcoming aliasing, is a known procedure which is described, for example, in W. H. Press et al, *Numerical Recipes in C*, Cambridge University Press, 1988, pp. 403–407.

STEP 240: A coarse registration between the resampled, increased resolution camera image and the current pattern, whose characteristics are known, is determined. The coarse registration is determined by inspecting the registration pattern in order to identify the magnification of the imaging process and the orientation of the pattern relative to the camera.

STEP 250: A fine registration between the resampled, increased resolution camera image and the current pattern is now determined. The approximate location of each display pixel's image within the resampled camera image is known from the coarse registration of step 240. The vicinity of each approximate location is now searched to find a local maximum intensity which is identified as the center of the image of the current display pixel. Preferably, the average distance between adjacent display pixel centers is computed.

STEP 260: Sum the resampled pixel values falling within a vicinity of the current display pixel image center. For example, the image processor may sum all resampled pixel values falling within a circle whose radius is approximately equal to half the average distance between adjacent display pixel centers.

STEP 270: Correct for residual aliasing and store the resulting plurality of numerical values as the intensities for the corresponding plurality of screen pixels included in the current pattern. Aliasing gives rise to a periodic modulation of the sums of the pattern dot intensities which is known in the art as a moire pattern.

A preferred method for correcting for residual aliasing includes the following steps:

a. Compute the period and orientation of the moire pattern based on the coarse registration information computed in step 240 and on the known period of the display panel pixels. A preferred method for performing the moire period and orientation computation is described in J. Krumm et al, *Sampled-grating and crossed-grating models of moire patterns from digital imaging*, Optical Engineering, vol. 30, no. 2, February 1991, pp. 195–206.

b. Sum the two-dimensional dot pattern intensities along a direction perpendicular to the wave vector of the moire pattern, i.e. along the moire "wavefronts". Normalize by dividing each resulting sum by the number of addends which were added to obtain the sum.

C. Use the normalized sum vector computed in step b to compute a correction factor. The correction factor is typically:

$$1 - \frac{S_i - A}{S_i},$$

where:

$S_i$=the i'th component of the normalized sum vector; and

A=the average of all components in the normalized sum vector.

A software implementation of a preferred method for correcting for residual aliasing is described in the listing entitled DEMO.c which is appended hereto as Appendix F. The routine which performs the method is entitled FIX_*RESULTS*.

STEP 280: Once a numerical value has been stored for each screen pixel, compute a central tendency of the numerical values, such as an average of the numerical values, thereby to define a "normal" intensity for the screen pixels.

STEP 290: Identify screen pixels whose intensities are other than "normal" and generate an output indication of these screen pixels.

It is appreciated that the patterns shown and described herein are merely exemplary of a general class of pattern sequences in which only a single pixel within a certain vicinity is actuated in any single pattern. All pixels within each vicinity are actuated, but only one at a time.

Appendix A is a computer listing of a preferred program which runs on a Sun SPARC 10 workstation, commercially available from Sun Microsystems, Mountain View, Calif., USA, with an Open Windows 3.0 environment, and with the Pixrect libraries and the software of Datacube's Max-Video20 image processor, commercially available from Datacube, Danvers, Mass., USA installed on a hard disk. The hardware of the MaxVideo20 is installed on the SPARC workstation bus and connected to the camera 160. Also used as a library are the object files of W. H. Press et al, *Numerical Recipes in C*. GCC and ACC are used as compilers.

The program of Appendix A performs the functions of FIG. 4.

Appendices B–O are subroutines, termed GRAB_GLOBALS, GRAB_PACKAGE, GRABCENTER, REMOTE, DEMO, RESAMPLE, CC_LINK, SCAN_FILES, SCAN_IF, SCAN_TEXT, OPTIONS, PIC_IO, GRAB and IMIO, respectively, which are called by the program of the executable file generated by the makefile of Appendix A.

Appendix P is a computer listing of a preferred software implementation of selective pixel actuator 130 of FIG. 1.

A preferred method of utilizing the above Appendices in the above described environment to obtain a PC display panel inspection system constructed and operative in accordance with a preferred embodiment of the present invention, including the following steps:

a. Type in the files of Appendices A to P using a VI editor.
b. Compile the files of Appendices A to O, using the makefile of Appendix A.
c. To inspect the display panel of a PC such as an IBM ThinkPad 750C, compile Appendix P on the PC, using the Borland Turbo C compiler.
d. Connect the RS232 output of the PC and the Sun SPARC workstation using a conventional cable.
e. On the PC, type: FPD 1

On the SPARC workstation, type: DEMO

The SPARC workstation will then load a first pattern onto the PC. Processing of the first pattern is described in steps f onward.

f. Open the option menu presented by the DEMO on the SPARC and adjust the following parameters: The spacing between the dots on the PC, the number of dots along the horizontal axis and the number of dots along the vertical axis.
g. To performs steps 210 and 230 of FIG. 4, press the GRAB button in order to grab an image into the TOOLS memory.

Optionally, the GRABCENTER.C file may be modified to include the process of step 220 of FIG. 4 and recompiled, in which case step g will also implement step 220.

h. Press the PERIOD button on the DEMO tool in the Sun.
i. Use the SPARC mouse to designate the four registration pattern pixels. At this point, the system carries out step 240 of FIG. 4.
j. To perform steps 250, 260 and 270 of FIG. 4, press the ADD button on the tool. The output of the process includes the following two files:
   i. GRABBED.VALS, including the intensity values of the pixels included in the pattern, uncorrected for residual aliasing; and
   ii. GRABBED.FIXED, including the intensity values of the pixels included in the pattern, corrected for residual aliasing.

If desired, steps f onward may be repeated for other patterns. To load other patterns, the DEMO.c file may be suitably modified to generate a new pattern.

It is appreciated that the particular embodiment described in the Appendices is intended only to provide an extremely detailed disclosure of the present invention and is not intended to be limiting. The present invention need not be implemented in software and may, instead, be implemented in dedicated hardware.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

APPENDIX A

```
CC      = acc
ZC      = /usr/lang/acc
INC_NR  = -I/users/erez/include
LIB_NR  = -L/users/erez/lib -lnmrcp
DDB     = /net/lychee/users/public/ddb/ddb2.o GFLAGS  = -g
OFLAGS  = -O4
CPPFLGS = -I/usr/openwin/include ${INC_PP} -I.

LDFLAGS = -L/users/erez/x/xdemo/imageflow/lib -L/users/erez/x/xdemo/lib
SYSLIBS_NEW = -limio -lipcx -lubc -lpixrect  -lm -ldq
DCINC   = -I/users/erez/x/xdemo/imageflow/include COMPILE = ${CC} -c -o $@ ${CFLAGS} ${CPPFLGS}
ACC     = acc
CCHOME  = /usr/local/CC/SC1.0           # C++ directory TOOL    = -lpixrect -lxview -lolgx -lX11
MATH    = -lm

############################################# an implicit compilation rule

.c.o:
        ${CC} ${GFLAGS} -w -c  $< -o $*.o ${CPPFLGS} ${DCINC} ${INC_NR}

###################################################

MLIB = \
        /usr/lib/debug/mallocmap.o \
        /usr/lib/debug/malloc.o

MORE    = \
        /users/erez/lib/options.o \
        /users/erez/lib/pic_io.o \
        ${DDB}

SCAN_LIB = \
        /alg-spc/share/danny/ma/scan.o \
        /alg-spc/share/danny/ma/cc_link.o ver_tool.h

############################################
demo: demo.o grab_globals.o grab_package.o grabcenter.o  pc/unix/remote.o
        ${CC} -o demo demo.o grab_globals.o grab_package.o grabcenter.o pc/unix/)
        $(CCHOME)/patch $@

FORCE :

# Comments:
# libnmrcp.a is a library that contains all objects on sources provided with
# the book numerical recipes in C, by W.H.Press Cambridge press.
# The libraries libimio.a  libipcx.a libubc.a libdq.a are libraries provided
# with datacube frame grabber, the same is for all software under directoy
# imageflow.

# malloc_debug.o malloc.c x11 and pixrect libraries and include files can
# be bought from SUN Inc.
```

```

# The file remote.c is a source code that communicate with laptop pc and
# makes is produce the desired pattern.
```

U 010126-2

APPENDIX B

Page 1

```
define REF include <stdio.h>
include <datacube.h>
#include <sys/time.h>
#include "grab.h"
#include "grab_globals.h"

static char sccsid[] = "wf/src/datacube/grab  @(#)grab_globals.c     1.2 90/0(
```

B/2

```
/*
   wf/src/datacube/grab    @(#)grab_globals.h    1.6 91/05/23
*/

REF DqSystem    oSystem ;
REF DqIPDev     oAa00, oAs00, oAg00, oAp00 ;
REF DqSurf      oAcqSrc, oAcqDst, oAcqDst2;
REF DqSurf      poAcqDst[3];
REF DqSurf      oDispSrc, oDispDst, oOvlySrc ;
REF DqPipe      oAcqPipe, oAcqPipeCont, oDispPipe ;
REF struct      timeval time_start, time_end ;
REF float       run_time ;
REF int         iPat, iPatdone ;
REF int         iPatE[4],iPatdoneE[4];
REF int         DC_ADC_width,DC_ADC_height,DC_HAuxStart,DC_HAuxEnd;
REF int         DC_VsyncToActive,GRAB_FORMAT,DC_INTERLACE;
REF int         AS_S1_STATE,AS_S5_STATE,DC_VSYNC_START_TIME,DC_SYNC_SOURCE;
REF int         AS_S9_STATE,AS_S11_STATE ;
REF int         DC_AS_S3_SOURCE, DC_AS_S13_SOURCE;
REF int         DC_TEXT_COLOR,DC_MARKER_COLOR;
REF float       DC_dcoff;
REF double      DC_AnGain, DC_AnOffset;
REF double      DC_FrameFreq, DC_LineFreq, DC_HSyncToActive, DC_HActiveTime;
REF double      DC_AnLpf,DC_AnBoost;
```

APPENDIX C

```c
define REF extern include <stdio.h>
include <datacube.h>
#include "cext.h"
#include <sys/time.h>
#include "grab.h"
#include "grab_globals.h"
#include "dbug.h"

/**$b*/
/*****************************************************/
/* routine to do initialization of the datacube
   devices
*/
int init_maxvideo20 ()

/**$e*/
{
  oSystem = dqCreateSys ("dqsys.cfg") ;
  oAa00 = dqFindIPDev (oSystem, "aa00") ;
  oAs00 = dqFindIPDev (oSystem, "as00") ;
  oAg00 = dqFindIPDev (oSystem, "ag00") ;
  oAp00 = dqFindIPDev (oSystem, "ap00") ;

dqSetTimingSwitch(oAs00,AS_S3,5); /* CONNECT AS_K5 TO AUXOUT   */
  dqSetTimingKVal(oAs00, AS_K5, 0); /* SET ITS OUTPUT TO LOW  */

}
/**$b*/
/*****************************************************/
/* routine to prepare connection to grab frame from
   the AS to MEM0
*/
int prep_grab (width, height,p2_st)
     int    width ;
     int    height ;
     int    *p2_st;            /* OUT - error status */
/**$e*/
{

/*    specify camera video signal */ oAcqSrc = dqCreateSurf (oAs00, AS_ADC, DC_ADC_width, DC_ADC_height) ;
  asSpecVideoSync(oAs00,AS_ADC, DQ_VIDSYNC_COMP_VID,DQ_PIXELCLOCK_NONE,DQ_TRUE,D(
  dqSetAnCouple(oAs00,AS_COUPLE,DQ_COUPLE_AC);

dqSetAnRef(oAs00, AS_ADC_OFFS, DQ_DC_REF_GEN_CLAMP) ; /* GEN is used usually *,
  asSetFifoXfr(oAs00, AS_FIFO_IRREGULAR) ;
  dqSpecVideoLine(oAs00,AS_ADC, DC_LineFreq,DC_HSyncToActive,DC_HActiveTime);
  dqSpecVideoFrame(oAs00,AS_ADC,DC_INTERLACE,DC_FrameFreq, DC_VsyncToActive);

asSpecHAux(oAs00, DC_HAuxStart,DC_HAuxEnd) ; /* set after spec video=>4 times p

/* set the switches for the external H and V sync */ dqSetSyncSrc(oAs00,AS_LPC,DC_SYNC_SOURCE);
  dqSetTimingSwitch(oAs00,AS_S1,AS_S1_STATE); /* PLL input during vsync */
  dqSetTimingSwitch(oAs00,AS_S5,AS_S5_STATE); /* Horiz. proc. input */

/*   dqSetTimingSwitch(oAs00,AS_S11,0);  vertical counter reset external = 0 */
/*   dqSetTimingSwitch(oAs00,AS_S6,1);     take VSYNC from ecsync */ dqSetTimingSwitch(oAs00,AS_S11,AS_S11_STATE);
  dqSetTimingSwitch(oAs00,AS_S9,AS_S9_STATE);
```

```
  dqSetTimingSwitch(oAs00,AS_S13,DC_AS_S13_SOURCE);
/* 2 => Set VME bus interrupt to get AUXIN */

/* Set   LPF and BOOST values       */ dqSetAnLPFCutoff(oAs00, AS_LPF, DC_AnLpf);
  asSetLPFBoost(oAs00, DC_AnBoost);

/* CONNECT AS_K5 (5)TO AUXOUT */
  dqSetTimingSwitch(oAs00,AS_S3,DC_AS_S3_SOURCE);
  if(DC_VSYNC_START_TIME != 0)
    _dqPokeWord(oAs00,0x14,0xFFFF, DC_VSYNC_START_TIME);

oAcqDst = dqCreateSurf(oAa00, AA_MEM0, width, height);
  oAcqDst2 = dqCreateSurf(oAa00, AA_MEM1, width, height);
  gsClearView (oAcqDst, 0) ;
  gsClearView (oAcqDst2, 0) ;

dqConnect(oAa00, DQ_CSG, AA_OP00) ;
  dqConnect(oAa00, DQ_CSG, AA_OP01) ;

poAcqDst[0] = oAcqDst;
  poAcqDst[1] = oAcqDst2;
  poAcqDst[2] = (DqSurf) NULL;

}
/**$b*/
/****************************************************/
/* routine to grab continuous frame from
   the AS to MEM1
*/
int grab_continuous (p2_st)
     int    *p2_st;            /* OUT - error status */
/**$e*/
{
  int      iEvent ;

dqSetAnGain(oAs00, AS_GAIN, DC_AnGain) ;
  dqSetAnOffset(oAs00, AS_COUPLE_OFFS, DC_dcoff) ;
  dqSetAnOffset(oAs00, AS_ADC_OFFS, DC_AnOffset) ;
  dqSetTimingKVal(oAs00, AS_K5, 1); /* SET ITS OUTPUT TO HIGH   */ oAcqPipeCont = dqCreateMultiDstPipe(poAcqDst, DQ_TRG_CONTINUOUS);
  dqArmPipe(oAcqPipeCont, DQ_DSM_PIPE);
  dqFirePipe (oAcqPipeCont) ;

*p2_st = 0 ;

}
/**$b*/
/****************************************************/
/* routine to grab oneshot frame from the AS to MEM0
*/
int grab_oneshot (p2_st)
     int    *p2_st;            /* OUT - error status */
/**$e*/
{
  int      iEvent ;

dqSetAnGain(oAs00, AS_GAIN, DC_AnGain) ;
  dqSetAnOffset(oAs00, AS_COUPLE_OFFS, DC_dcoff) ;
  dqSetAnOffset(oAs00, AS_ADC_OFFS, DC_AnOffset) ;
```

```
    iEvent = emFindPipeEvent (oAcqPipe) ;
    DC_inquire_grab_param();
    dqFirePipe (oAcqPipe) ;
    dqSetTimingKVal(oAs00, AS_K5, 1); /* SET ITS OUTPUT TO LOW  */
    emWaitRefEvent (iEvent, 1) ;
    dqSetTimingKVal(oAs00, AS_K5, 0); /* SET ITS OUTPUT TO LOW  */
    *p2_st = 0 ;
}

/**$b*/
/******************************************************/
/* routine to prepare and fire the display pipe, and
   prepare the overlay surface and connections.
*/
int display_pipe_VGA (p2_st)
     int    *p2_st;             /* OUT - error status */
/**$e*/
{
    oDispSrc = dqDupSurf(oAcqDst2);
    oOvlySrc = dqCreateSameSizeSurf(oAa00, AA_MEM3, oAcqDst2);

/* Connect DispPipe */ dqConnect(oAa00, AA_DM1, AA_CGG);
    dqConnect(oAa00, AA_DISP1, AA_DM1);

dqConnect(oAg00, AG_GREEN, AG_DAC_LUT_SRC);
    dqConnect(oAg00, AG_DAC_LUT, AG_DAC_SRC);

dqSetSyncEnable(oAg00, AG_V_GREEN, DQ_TRUE);
    dqSpecXmtExpansion(oAa00, AA_DISP1, 4, 1);
    dqSpecXmtExpansion(oAa00, AA_DISP3, 4, 1);

/* Define surfaces on AG_DAC */

/*    dqSpecStdSurfSize(oAg00, AG_DAC, VGAPlusXSize, VGAPlusYSize); */ dqSpecStdSurfSize(oAg00, AG_DAC, RS170XSize, RS170YSize);
    oDispDst = dqCreateStdSizeSurf(oAg00, AG_DAC);

/* Attach gateways to surfaces */ dqAttachSurfGate(oDispDst, AG_RCV);
    dqAttachSurfGate(oDispSrc, AA_DISP1);

/* Overlay connections */ dqConnect(oAa00, AA_DM3, AA_CGO);
    dqConnect(oAa00, AA_DISP3, AA_DM3);
    dqConnect(oAg00, AG_CGO_N0, AG_OVLY_LUT_SRC);
    dqSetKVal(oAg00, AG_OVLY_MASK, 0xF);
    dqSetOvlyMask(oAg00, AG_OVLY, 0xF);
    dqSetOvlyOp(oAg00, AG_OVLY, DQ_OVLY_ON);
    dqAttachSurfGate(oOvlySrc, AA_DISP3);
    agInitOvlyLutColor(oAg00);

/* Create continuous pipe */ oDispPipe = dqCreatePipe(oDispDst, DQ_TRG_CONTINUOUS);

/* Arm and fire DispPipe */ dqArmPipe(oDispPipe, DQ_DSM_PIPE);
    dqFirePipe(oDispPipe);
```

```
}
/**$b*/
/******************************************************/
/* routine to find the element event of the sensor
    in AS
*/
int create_grab_pipe (p2_st)
      int    *p2_st;             /* OUT - error status */
/**$e*/
{ oAcqPipe = dqCreateMultiDstPipe(poAcqDst, DQ_TRG_ONESHOT);
  dqArmPipe(oAcqPipe, DQ_DSM_PIPE);
}

/**$b*/
/******************************************************/
/* routine to define a pat for one shot grabbing    */ int prep_oneshot_grab_pat (p2_st)
      int    *p2_st;             /* OUT - error status */
/**$e*/
{
  int       iPipeEvent;

emBegPatDef() ;

/*  dqConnect (oAa00, DQ_CSG, AA_OP00) ;   redundent- yes */
  dqSetAnGain(oAs00, AS_GAIN, DC_AnGain) ;
  dqSetAnOffset(oAs00, AS_ADC_OFFS, DC_AnOffset) ;
  dqArmPipe(oAcqPipe, DQ_DSM_RECT);
  iPipeEvent = emFindPipeEvent (oAcqPipe) ;
  dqFirePipe (oAcqPipe) ;
  emWaitRefEvent (iPipeEvent, 1) ;
  dqSetTimingKVal(oAs00, AS_K5, 0); /* SET ITS OUTPUT TO LOW   */ iPat = emEndPatDef() ;
  iPatdone = emFindPatEvent(iPat) ;
}

/**$b*/
/******************************************************/
/* routine to define a pat in order to wait for the sensor event
   and then grab a picture
*/
int prep_grab_pat (proc_rect_vec, gain_vec, offset_vec, p2_st)
      DqRect  proc_rect_vec[] ; /* IN  */
      double  gain_vec[] ;      /* IN  */
      double  offset_vec[] ;    /* IN  */
      int    *p2_st;             /* OUT - error status */
/**$e*/
{
  int       iPipeEvent, iSensorEvent, i ;

emBegPatDef() ;
  dqConnect (oAa00, DQ_CSG, AA_OP00) ;

for (i=0; i<3; i++)
      {
         dqSetAnGain(oAs00, AS_GAIN, DC_AnGain) ;

dqSetAnOffset(oAs00, AS_ADC_OFFS, DC_AnOffset) ;

dqSpecSurfAlignPoint(oAcqDst,0,0);
         dqSetSurfProcRect(oAcqDst,proc_rect_vec[i]);
         dqSpecSurfAlignPoint(oAcqDst,proc_rect_vec[i].lXMin,proc_rect_vec[i].lY
```

```
            dqArmPipe(oAcqPipe, DQ_DSM_RECT);
            iPipeEvent = emFindPipeEvent (oAcqPipe) ;
            dqFirePipe (oAcqPipe) ;
            emWaitRefEvent (iPipeEvent, 1) ;
         } dqSetTimingKVal(oAs00, AS_K5, 0); /* SET ITS OUTPUT TO LOW   */
   iPat = emEndPatDef() ;
   iPatdone = emFindPatEvent(iPat) ;
}
/**$b*/
/*****************************************************/ int grab_oneshot_PAT (p2_st)
      int    *p2_st;          /* OUT - error status */
/**$e*/
{ dqSetTimingKVal(oAs00, AS_K5, 1); /* SET ITS OUTPUT TO HIGH  */
   emMarkRefEvent(iPatdone);
   emRunPat(iPat) ;
   emWaitRefEvent(iPatdone, 1);

*p2_st = 0 ;

}

/**$b*/
/*****************************************************/
/* routine to define a pat in order to wait for the sensor event
   and then grab a picture
*/
int grab_after_trigger (p2_st)
      int    *p2_st;          /* OUT - error status */
/**$e*/
{
   int     iEventAS_XMT;
/*
#ifdef time
  gettimeofday(&time_start,NULL);
#endif
*/ iEventAS_XMT = emFindElemEvent(oAs00, AS_XMT, DQ_EV_DONE);
   emMarkRefEvent(iPatdone);
/*   emRunPat(iPat) ;*/
   emRunPatOnEvent(iPat, iEventAS_XMT ,1);
   dqSetTimingKVal(oAs00, AS_K5, 1); /* SET ITS OUTPUT TO HIGH  */
   emWaitRefEvent(iPatdone, 1);

/*
   emCyclePatOnEvent(iPat,iPatdone);
   emSimulateEvent(iPatdone);
   printf("Waiting for Vsync\n");
*/
/*
#ifdef time
  gettimeofday(&time_end,NULL);
  run_time = time_end.tv_sec - time_start.tv_sec +
     ( time_end.tv_usec - time_start.tv_usec) * 1e-6 ;
  dbug_msg_out (user_level, "time to grab frame after triger is %f sec\n",run_tir
#endif
*/
   *p2_st = 0 ;
```

```
}
/****************************************************************/ int prep_E_pat (proc_rect_vec,p2_st)
     DqRect proc_rect_vec[] ; /* IN   */
     int    *p2_st;           /* OUT - error status */

{
   int    i,iPipeEvent;

for(i=0 ; i<4 ; i++){ emBegPatDef() ;

dqConnect (oAa00, DQ_CSG, AA_OP00) ;
     dqSpecSurfAlignPoint(oAcqDst,proc_rect_vec[i].lXMin,proc_rect_vec[i].lYMin);
     dqSetSurfProcRect(oAcqDst,proc_rect_vec[0]);

dqArmPipe(oAcqPipe, DQ_DSM_RECT);
     iPipeEvent = emFindPipeEvent (oAcqPipe) ;
     dqFirePipe (oAcqPipe) ;
     emWaitRefEvent (iPipeEvent, 1) ;

dqSetTimingKVal(oAs00, AS_K5, 0); /* SET ITS OUTPUT TO LOW  */
     iPatE[i] = emEndPatDef() ;
     iPatdoneE[i] = emFindPatEvent(iPatE[i]) ;
   }
}
/****************************************************************/ int run_E_pat (i,p2_st)
     int    i;            /* IN  - pat number    */
     int    *p2_st;       /* OUT - error status */
/**$e*/
{
   int    iEventAS_XMT;

iEventAS_XMT = emFindElemEvent(oAs00, AS_XMT, DQ_EV_DONE);
   emMarkRefEvent(iPatdoneE[i]);
   emRunPatOnEvent(iPatE[i], iEventAS_XMT ,1);
   dqSetTimingKVal(oAs00, AS_K5, 1); /* SET ITS OUTPUT TO HIGH  */
   emWaitRefEvent(iPatdoneE[i], 1);

*p2_st = 0 ;
}

/**$b*/
/****************************************************************/ void   load_grab_param(p2_st)

int              *p2_st;    /* OUT - error status  */

/**$e*/

{

FILE *fp_param;
   char param[64];
   char svalue[64];
   int  i,j,value;

fp_param = fopen("grab_parameters.dat","r");

while(fscanf(fp_param,"%s %s",param,svalue) !=EOF)
     {
```

```
      value = atoi(svalue);

if (strcmp(param,"DC_ADC_width")==0){
      DC_ADC_width = value;
      printf("\n DC_ADC_width = %d \n",DC_ADC_width);
    }
      else if (strcmp(param,"DC_ADC_height")==0){
      DC_ADC_height = value;
      printf("\n DC_ADC_height = %d \n",DC_ADC_height);
    }
      else if (strcmp(param,"DC_INTERLACE")==0){
      DC_INTERLACE = value;}
      else if (strcmp(param,"DC_HAuxStart")==0){
      DC_HAuxStart = value;}
      else if (strcmp(param,"DC_HAuxEnd")==0){
      DC_HAuxEnd = value; }
      else if (strcmp(param,"DC_VsyncToActive")==0){
      DC_VsyncToActive = value;
      printf("\n DC_VsyncToActive = %d \n",DC_VsyncToActive);
    }
      else if (strcmp(param,"DC_AnGain")==0){
      DC_AnGain = ((double) value)/10.0; }
      else if (strcmp(param,"DC_AnOffset")==0){
      DC_AnOffset = ((double) value); }
      else if (strcmp(param,"DC_FrameFreq")==0){
      DC_FrameFreq = ((double) value); }
      else if (strcmp(param,"DC_LineFreq")==0){
      DC_LineFreq = ((double) value); }
      else if (strcmp(param,"DC_HSyncToActive")==0){
      DC_HSyncToActive = ((double) value)/100.0; }
      else if (strcmp(param,"DC_HActiveTime")==0){
      DC_HActiveTime = ((double) value)/100.0; }
      else if (strcmp(param,"DC_AnLpf")==0){
      DC_AnLpf = ((double) value)/100.0; }
      else if (strcmp(param,"DC_AnBoost")==0){
      DC_AnBoost = ((double) value)/100.0; }
      else if (strcmp(param,"AS_S1_STATE")==0){
      AS_S1_STATE = value; }
      else if (strcmp(param,"AS_S5_STATE")==0){
      AS_S5_STATE = value; }
      else if (strcmp(param,"AS_S9_STATE")==0){
      AS_S9_STATE = value; }
      else if (strcmp(param,"AS_S11_STATE")==0){
      AS_S11_STATE = value; }
      else if (strcmp(param,"DC_VSYNC_START_TIME")==0){
      DC_VSYNC_START_TIME = value; }
      else if (strcmp(param,"DC_SYNC_SOURCE")==0){
      DC_SYNC_SOURCE = value; }
      else if (strcmp(param,"DC_AS_S3_SOURCE")==0){
      DC_AS_S3_SOURCE = value; }
      else if (strcmp(param,"DC_AS_S13_SOURCE")==0){
      DC_AS_S13_SOURCE = value; }
      else if (strcmp(param,"DC_dcoff")==0){
      DC_dcoff = ((float) value)/10.0  ; }
      else if (strcmp(param,"DC_TEXT_COLOR")==0){
      DC_TEXT_COLOR = value; }
      else if (strcmp(param,"DC_MARKER_COLOR")==0){
      DC_MARKER_COLOR = value; }
   }
  *p2_st = 0;

fclose(fp_param);

}
/******************************************************************/
```

```
int     DC_inquire_grab_param()

{
  int     param,phs,phe;
  double  dparam;
  DqEnum  Eparam;

dparam = dqInqAnGain(oAs00, AS_GAIN);
  printf("\n AS GAIN = %f",dparam);
  dparam = dqInqAnOffset(oAs00, AS_ADC_OFFS);
  printf("\n AS ADC OFFSET = %f",dparam);
  dparam = dqInqAnOffset(oAs00, AS_COUPLE_OFFS);
  printf("\n AS COUPLE OFFSET = %f",dparam);
  Eparam = dqInqAnCouple(oAs00, AS_COUPLE);
  printf("\n AS COUPLE = %d (AC=5072, DC=5073)",Eparam);
/*  asAskHAux(oAs00, &phs,&phe);
  printf("\n ASHAUXSTART = %d ,ASHAUXEND = %d ",phs,phe);
*/
  dparam = dqInqAnLPFCutoff(oAs00, AS_LPF);
  printf("\n AS LPF Cutoff = %f",dparam);
  dparam = asInqLPFBoost(oAs00);
  printf("\n AS LPF Boost = %f",dparam);
  _dqPeekWord(oAs00, 0x14, 0xFFFF,¶m);
  printf("\n  DC_VSYNC_START_TIME= %d ",param);

}
```

APPENDIX D

```c
define REF extern include <stdio.h>
include <datacube.h>
#include "cext.h"
#include "imio.h"
#include <sys/time.h>
#include "grab.h"
#include "grab_globals.h"
#include "dbug.h"

#define SMALL_X_SIZE 256
#define SMALL_Y_SIZE 256
#define X_OFFSET     200
#define Y_OFFSET     150
define SMALL_IMAGE_FLAG 1 static int first_time=1;

dqLimitIPDevSet(AA AS AG AP);

int grab_main(avgnum,ret_buf,xsize,ysize,xstart,ystart,xend,yend)
int avgnum;
unsigned char **ret_buf;
int *xsize;
int *ysize;
int xstart;
int ystart;
int xend;
int yend;
{
  static int      stat ,i,j,k,switch_value,Hshrink,Vshrink,p2_st;
  static int   switch_control;
  static char     Text[64],pcUserInpBuf[80];
  static DqRect   grabR[4],  adcR ;
  static double   gain_val[4] ;
  static double   offs_val[4] ;
  static DqByte   frame[480][512] ;
  static ohi_image_p    depth_img[4];
  static char           depth_name[4][64];

static int cnti,cntj,cntk;
  static int *intbuf;

if (first_time) {
    load_grab_param(&p2_st);
    init_maxvideo20() ;
    if (SMALL_IMAGE_FLAG)
      *ret_buf=malloc(SMALL_Y_SIZE*SMALL_X_SIZE);
    else
      *ret_buf=malloc((DC_ADC_width)*(DC_ADC_height));
    xstart=0;
    ystart=0;
    xend=DC_ADC_width;
    yend=DC_ADC_height;

prep_grab (1024,1024,&stat) ;
    oAcqPipe = dqCreateMultiDstPipe(poAcqDst, DQ_TRG_ONESHOT);
    dqArmPipe(oAcqPipe, DQ_DSM_PIPE);
    printf ("prep over\n");

first_time=0;
  } printf("Average Number %d\n",avgnum);
```

```
  adcR.lXMin = 0;
  adcR.lYMin = 0;
  adcR.lXMax = DC_ADC_width-1;
  adcR.lYMax = DC_ADC_height-1;

if (SMALL_IMAGE_FLAG) {
    xstart=0;
    ystart=0;
    xend=DC_ADC_width;
    yend=DC_ADC_height;
    if (xsize!=NULL) *xsize=SMALL_X_SIZE;
    if (ysize!=NULL) *ysize=SMALL_Y_SIZE;
  } else {
    if (xsize!=NULL) *xsize=adcR.lXMax+1;
    if (ysize!=NULL) *ysize=adcR.lYMax;
  } intbuf=(int*)calloc((DC_ADC_width)*(DC_ADC_height),sizeof(int));

for (cntk=0;cntk<avgnum;cntk++) {
    grab_oneshot (&stat) ;
    printf ("one shot over\n");
    depth_img[0] = imio_create_image(DC_ADC_width,DC_ADC_height,8,NULL);
    printf ("create image over\n");
    dqSpecSurfAlignPoint(oAcqDst,0,0);
    dqSetSurfProcRect(oAcqDst,adcR);
    dqRdRect(oAcqDst, &adcR,depth_img[0]->image);
    write_ubc_file("fromhw",depth_img[0]->image,adcR.lYMax,adcR.lXMax+1);
    printf ("recting over\n");
    printf ("%d %d %d %d\n",xstart,ystart,xend,yend);
    for (cntj=ystart;cntj<yend;cntj++)
      {
        for (cnti=xstart;cnti<xend;cnti++)
          intbuf[cntj*(adcR.lXMax+1)+cnti]+=
            (int)depth_img[0]->image[cntj*(adcR.lXMax+1)+cnti];
      }
  }
  printf ("summing over \n");

if (SMALL_IMAGE_FLAG) {
    for (cntj=0;cntj<SMALL_Y_SIZE;cntj++) {
      for (cnti=0;cnti<SMALL_X_SIZE;cnti++)
        (*ret_buf)[cntj*SMALL_X_SIZE+cnti]=
          intbuf[(Y_OFFSET+cntj)*(adcR.lXMax+1)+cnti+X_OFFSET]/avgnum;
    }
  } else {
    for (cntj=ystart;cntj<yend;cntj++) {
      for (cnti=xstart;cnti<xend;cnti++)
        (*ret_buf)[cntj*(adcR.lXMax+1)+cnti]=
          intbuf[cntj*(adcR.lXMax+1)+cnti]/avgnum;
    }
  } printf ("Avg done \n");
  free(intbuf);
/*
  printf ("free over\n");
  dqDisposePipe(oAcqPipe);
  dqDisposeSurf(oAcqDst);
  dqDisposeSurf(oAcqSrc);
  printf ("Dispose over \n");
*/
  return (GOOD_GRAB);
}
```

```
int print_switches_state()

{
  int switch_val;

switch_val = dqInqTimingSwitch(oAs00, AS_S1);
  printf("\n Switch value AS_S1 = %d \n",switch_val);
  switch_val = dqInqTimingSwitch(oAs00, AS_S3);
  printf("\n Switch value AS_S3 = %d \n",switch_val);
  switch_val = dqInqTimingSwitch(oAs00, AS_S5);
  printf("\n Switch value AS_S5 = %d \n",switch_val);
  switch_val = dqInqTimingSwitch(oAs00, AS_S6);
  printf("\n Switch value AS_S6 = %d \n",switch_val);
  switch_val = dqInqTimingSwitch(oAs00, AS_S8);
  printf("\n Switch value AS_S8 = %d \n",switch_val);
  switch_val = dqInqTimingSwitch(oAs00, AS_S9);
  printf("\n Switch value AS_S9 = %d \n",switch_val);
  switch_val = dqInqTimingSwitch(oAs00, AS_S10);
  printf("\n Switch value AS_S10 = %d \n",switch_val);
  switch_val = dqInqTimingSwitch(oAs00, AS_S11);
  printf("\n Switch value AS_S11 = %d \n",switch_val);
  switch_val = dqInqTimingSwitch(oAs00, AS_S13);
  printf("\n Switch value AS_S13 = %d \n",switch_val);
  return(0);

}
```

APPENDIX E

```c
#include <stdio.h>
#include <sys/fcntl.h>
#include <sys/termios.h>
#include <sys/types.h>
#include <sys/time.h>

/*--- LAYER #1: COMMS LIBRARY ---*/ initcomx( port_name )
char *port_name;
{
  int fd;
  int baud_rate;
  struct termios t;
  if ((fd = open( port_name, O_RDWR | O_CREAT,0644)) < 0) {
    fprintf(stderr,"couldn't open output port %s\n", port_name );
/*
    exit(2);
*/
    return (0);
  }
  baud_rate = B9600;
  if (ioctl(fd,TCGETS,&t) >= 0) {
    t.c_iflag &= ~(INLCR|ICRNL|IUCLC);
    t.c_oflag &= ~OPOST;
    t.c_cflag = baud_rate|CS8|CREAD;
    t.c_lflag &= ~(ICANON|ISIG|ECHO);
    t.c_cc[VMIN] = 1;
    t.c_cc[VTIME] = 0;
    ioctl(fd,TCSETS,&t);
  }
  return fd;
} int rcv_timeout = 5; /* Allow up to 5 seconds for response */ rcv_byte( int fd, char *c )
{
  fd_set readfds, mask;
  struct timeval timeout;
  int n;

FD_ZERO(&mask);
  FD_SET(fd,&mask);
  readfds = mask;
  timeout.tv_sec = rcv_timeout;
  timeout.tv_usec = 0;
  n = select(FD_SETSIZE,&readfds, 0, 0, &timeout);
  if( n > 0 && FD_ISSET(fd,&readfds))
    return read( fd, c, 1 );
  else
    return -1;
} xmt_str( int fd, char *s )
{
#ifdef DEBUG
  printf("'%s'",s);
#endif
  write( fd, s, strlen(s) );
} endcomx( int fd )
{
  close( fd );
```

```c
}
/*--- LAYER #2: REMOTE PROCEDURE LIBRARY ---*/ remote_execute( int fd , char *xmt)
{
  char b;
  int rc;

xmt_str( fd, xmt );
  rc = rcv_byte( fd, &b );
  if( rc == -1 )
    return 0;
  else
    return 1;
} remote_rgb( int fd, int index, int r, int g, int b )
{
  char xmt[80];

sprintf( xmt,"r %d %d %d %d\n\r", index, r, g, b );
  return remote_execute( fd, xmt );
} remote_block( int fd, int x, int y, int dx, int dy, int index )
{
  char xmt[80];

sprintf( xmt,"b %d %d %d %d %d\n\r", x, y, dx, dy, index );
  return remote_execute( fd, xmt );
} remote_circle( int fd, int x, int y, int radius, int index )
{
  char xmt[80];

sprintf( xmt,"c %d %d %d %d\n\r", x, y, radius, index );
  return remote_execute( fd, xmt );
} remote_grid( int fd, int x, int y, int dx, int dy, int sx, int sy, int index )
{
  char xmt[80];

sprintf( xmt,"g %d %d %d %d %d %d %d\n\r", x, y, dx, dy, sx, sy, index );
  return remote_execute( fd, xmt );
} remote_line( int fd, int x, int y, int x2, int y2, int index )
{
  char xmt[80];

sprintf( xmt,"l %d %d %d %d %d \n\r", x, y, x2, y2, index );
  return remote_execute( fd, xmt );
} remote_text( int fd, int x, int y, char *s, int index )
{
  char xmt[256];

sprintf( xmt,"t %d %d %d %s\n\r", x, y, index, s );
  return remote_execute( fd, xmt );
}
```

```
raised_block( int fd, int x, int y, int dx, int dy )
{
  remote_block( fd, x-1, y-1, dx+2, dy+2, 15 );
  remote_block( fd, x, y, dx+1, dy+1, 0 );
  remote_block( fd, x-1, y+dy, 1, 1, 0);
  remote_block( fd, x, y, dx, dy, 7 );
} lowered_block( int fd, int x, int y, int dx, int dy )
{
  remote_block( fd, x-1, y-1, dx+2, dy+2, 0 );
  remote_block( fd, x, y, dx+1, dy+1, 15 );
  remote_block( fd, x-1, y+dy, 1, 1, 15);
  remote_block( fd, x, y, dx, dy, 7 );
} window( int fd, int x, int y, int dx, int dy, int color )
{
  raised_block( fd, x-4, y-4, dx+8, dy+8);
  lowered_block( fd, x, y, dx, dy);
  remote_block( fd, x, y, dx, dy, color );
} remote_test( int fd )
{
  char tmp[80];
  int n, i,x,y,dx,dy,xinc,yinc;

/*--- Clear Screen ---*/
  remote_block( fd, 0, 0, 640 , 480, 0 );
  remote_grid( fd, 0, 0, 640, 480, 3, 3, 0xB);

/*--- Color Block Window ---*/
  x = 30, y=30, dx = 270, dy = 200;
  remote_grid( fd, x+6, y+6, dx+6, dy+6, 3, 3, 8 );
  window( fd, x, y, dx, dy, 1 );

/*--- Grid Window ---*/
  x = 330, y=30, dx = 270, dy = 200;
  remote_grid( fd, x+6, y+6, dx+6, dy+6, 3, 3, 8 );
  window( fd, x, y, dx, dy, 0 );
  remote_grid( fd, x, y, dx, dy, 2, 2, 1 );

/*--- Text Window ---*/
  x = 30, y=255, dx = 270, dy = 200;
  remote_grid( fd, x+6, y+6, dx+6, dy+6, 3, 3, 8 );
  window( fd, x, y, dx, dy, 7 );
  remote_text( fd, x+10, y+10, "A successful tool is one that", 1 ), y+=10;
  remote_text( fd, x+10, y+10, "was used to do something ", 1 ), y+=10;
  remote_text( fd, x+10, y+10, "undreamed of by it's author", 1 ), y+=10;
  y += 20;
  remote_text( fd, x+10, y+10, "        S. C. Johnson", 1 ), y+=10;
  y += 20;
  remote_text( fd, x+10, y+10, "   Whenever anyone says     ", 1 ), y+=10;
  remote_text( fd, x+10, y+10, "'theoretically', they really ", 1 ), y+=10;
  remote_text( fd, x+10, y+10, "mean, 'not really'.          ", 1 ), y+=10;
  y += 20;
  remote_text( fd, x+10, y+10, "        Dave Parnas", 1 ), y+=10;

/*--- Graphics Window ---*/
  x = 330, y=255, dx = 270, dy = 200;
  remote_grid( fd, x+6, y+6, dx+6, dy+6, 3, 3, 8 );
  window( fd, x, y, dx, dy, 0 );
  n = 40;
```

```
  xinc = dx/n;
  yinc = dy/n;
  for( i=0; i<n; i++){
    remote_line( fd, x,y+i*yinc,x+xinc*i, y+dy-1, 1);
    remote_line( fd, x+i*xinc,y,x+dx-1, y+i*yinc, 1);
  }
  x += dx/2;
  y += dy/2;
  for( i=0; i<16;i++ ){
    remote_circle( fd, x, y, 3*i, 15-i );
    remote_circle( fd, x, y, 3*i+1, 15-i );
    remote_circle( fd, x, y, 3*i+2, 15-i );
  }
}

/* #define DEBUG */
#ifdef DEBUG
main()
{
  int fd;

fd = initcomx("/dev/ttyb");
  remote_test( fd );
  endcomx(fd);
}
#endif
```

APPENDIX F    U 010126-2

```c
/*********************************************************************

DEMO TOOL
    FINAL FPD PANEL INSPECTION TOOL
    EREZ SALI
    FEBRUARY 1994

**********************************************************************/ include <stdio.h>
include <math.h>
#include <X11/X.h>
#include <X11/Xlib.h>
#include <xview/xview.h>
#include <xview/canvas.h>
#include <xview/panel.h>
#include <xview/cms.h>
#include <xview/xv_xrect.h>
#include <xview/scrollbar.h>
#include <xview/font.h>
#include <xview/cursor.h>
#include <xview/screen.h>
include <grab.h> define Pi 3.141592654 define DYNAMIC_REG 1           /* accumulate around local peak ? */
define ZOOM_INTENSITY 0
#define FIX_RESULTS_FLAG 1              /* if you feel like fixing results pattei
#define MAX_MAHZOR  8           /* maximum allowed length of a mahzor */
#define ZOOM_FACTOR 4
#define GOVA 360
#define ROHAV 400
#define MARK_TOL 5 /* user marking tolerance */
#define min(a,b) ((a) < (b) ? (a) : (b))
#define max(a,b) ((a) > (b) ? (a) : (b))

typedef unsigned char   PIXEL;

static double line_pix_ratio,row_pix_ratio,sqr_ratio;
static int xcell=26,ycell=26; /* number of cells in each direction */
static int cell_spacing=7;
static double deltax,deltay;
static int show_gray_flag=0;
static double *final_buf;
static double alfa;
static double corner_x1,corner_y1,corner_x2,corner_y2,corner_x3,corner_y3,corner_
static double dx,dy;
static int resample[MAX_MAHZOR][4];     /* coefficient tables */
static unsigned char next_ind[MAX_MAHZOR]; /* cycle generator */
static int advance[MAX_MAHZOR]; /* advance lut */
static int first_grab=1;
static double *result;
static char   fname[200];
static char   valsname[200];
static PIXEL  *image;
int     avgnum=1;
int     x_size=ROHAV, y_size=GOVA, n_pix;
int rows,cols,newrows,newcols;
int     period_point=0;
int     scrollbar_width;
char    msg[200];

int pcfd;
typedef enum {RED, GREEN, BLUE, WHITE} pc_color;
pc_color pattern_color=GREEN;
```

```c
typedef enum {CLEAR,GRID,RECT} pc_disp;
pc_disp pattern_type=GRID;
int pc_gl=255;

Frame     frame, zoom_frame, options_frame, hist_frame;
Pixrect   *color_pr, *icon_pr;
Panel     panel, options_panel;
Panel_item message_item[3], fname_item;
Panel_item color_item,disp_item;
Canvas    main_canvas, Zoom, num_zoom;
Panel_item text_item[20];
XColor    gray_color[65];

int     repaint_zoom(), repaint_main(), repaint_hist();
int     done(), resize_proc(), zoom_proc(), options_proc();
int     scan_proc(), next_proc(), prev_proc(), first_proc(), last_proc();
int     load_proc(), pos();
int     period_proc(),grab_proc();
Cms     fgtool_cms;
static Notify_value frame_proc();
void fine_tune(double *a,double *b);
void set_xcell(Panel_item item,Event *event);
void set_ycell(Panel_item item,Event *event);
void set_avgnum(Panel_item item,Event *event);
void set_cell_spacing(Panel_item item,Event *event);
double sum_all(double xpos,double ypos,double length);
void accum_proc(void);
get_coefficients(lut, offset);
void resize_image(PIXEL **cur_image,int zoom_factor);
unsigned char *resampl(unsigned char *oldpic);
int grab_main(int avgnum,unsigned **ret_buf,int *xsize,int *ysize,int xstart,int
/* e_fit(float *x,float *y,int ndata,float *coef,int ncoef); */
void fix_results(void);
int selected_color(Panel_item item,Event *event);
int selected_disp(Panel_item item,Event *event);
void set_pc_gl(Panel_item item,Event *event);

XImage *ximage;                  /* drawable image */ static Display    *sdpy;

/*****************************************************************/ handle_error() { abort(); } main(argc,argv)
    int argc;
    char **argv;
{
  extern int fullscreendebug;   /* dbxtool */
  extern int _Xdebug;

_main();                        /* lama? kakha (bishvil scan_files) */
  fullscreendebug = 1;            /* enable deboog */ get_option_init(argc,argv);

if (get_option_flag('x'))      /* lock server to client */
    _Xdebug = 1;
  if (get_option_flag('d'))      /* test allocation heaps */
    malloc_debug(2);

xv_init(XV_INIT_ARGC_PTR_ARGV, &argc, argv,
          XV_ERROR_PROC,handle_error,
```

```
            XV_X_ERROR_PROC,handle_error,
         NULL);

if (argc!=1) read_input(argc, argv);
  init_window();
  pcfd=initcomx("/dev/ttya");
  if (pcfd==0)
     show_msg(0, "Cannot Open Communication to port", TRUE);
  else if (0==repaint_pc())
     show_msg(0, "Can Not Draw on Pc", TRUE);

if (argc!=1) {
    iconize();
    draw();
  }
  window_main_loop(frame);
}

/*********************************************************************/
read_input(argc, argv)
     int argc;
     char *argv[];
{
  char *p;

if (get_option_flag('h') || (argc != 2 && !get_option_flag('i')))
     {
       fprintf(stderr, "Usage: fgtool image-file-name\n");
       exit(0);
     } if (get_option_flag('i'))
     strcpy(fname, (char*)get_option_value('i'));
  else
     strcpy(fname, argv[1]);

if (p = (char *)scan_files("", fname))
     strcpy(fname, p);

if(*fname == '\0' ||
     !read_pic(fname,&image,&y_size,&x_size))
     {
       fprintf(stderr, " cannot read file %s",fname);
       exit(-1);
     } resize_image(&image,ZOOM_FACTOR);
  x_size*=4;
  y_size*=4;

color_pr = mem_create(x_size, y_size, 8);

}

/*********************************************************************/
#define point_color_val(k)    (((k) < 16) ? 31 : 0)
#define point_color(k)        (PIX_SRC|PIX_COLOR(point_color_val(k)))
#define RADIUS   15
#define PIX_SZ   7
#define PIX_CNT  (RADIUS*2+1)
```

```
#define ZOOM_SIZE (PIX_CNT*(PIX_SZ+1)+6)

zoom_de_image(canvas, event, lock)
    Canvas  canvas;
    Event   *event;
    int     lock;
{
  int       x, y, x0, y0, i, j;
  Pixwin    *Zoom_pw = (Pixwin *)canvas_pixwin(Zoom);
  PIXEL     pix;
  static Rect   pw_rect = {0, 0, ZOOM_SIZE, ZOOM_SIZE};
  static    lockx, locky;
  static dist = PIX_SZ+1;
  static center = RADIUS*(PIX_SZ+1);

if (!image) return;

if (lock)
    x = lockx, y=locky;
  else
    lockx = x = event_x(event), locky = y = event_y(event);

if (x < 0 || y < 0 || x >= x_size || y >= y_size)
    return;

sprintf(msg,"x=%3d y=%3d ", x, y);
  show_msg(1, msg, FALSE);

/* zoom gray image */
  for(i = -RADIUS,x0 = x-RADIUS; i <= RADIUS; i++, x0++)
    for(j = -RADIUS, y0 = y-RADIUS; j <= RADIUS; j++, y0++)
      if (x0 >= 0 && y0 >= 0 && x0 < x_size && y0 < y_size)
        {
          pix = image[x0+x_size*y0]>>2;
          pw_rop(Zoom_pw, 3+center+i*dist, 3+center+j*dist, dist, dist,
                  PIX_SRC | PIX_COLOR(pix), 0,0,0);
        }
      else
        pw_rop(Zoom_pw, 3+center+i*dist, 3+center+j*dist, dist, dist,
                PIX_SRC | PIX_COLOR(0), 0,0,0);

pix = image[x+x_size*y]>128 ? 0 : 63;
  pw_rop(Zoom_pw, center+PIX_SZ, center+PIX_SZ, 2, 2,
          PIX_SRC|PIX_COLOR(pix), 0, 0, 0);

show_grays(image+y*x_size+x);

}

/**********************************************************************/
init_window()
{
  Pixfont *button_font;
  char    label[100];
  Scrollbar hs, vs;

/* create frame */
  strcpy(label, "Brightness Inspection Tool: ");
  strcat(label, fname);
  frame = xv_create(NULL,FRAME,
                    WIN_X,0,
                    WIN_Y,0,
                    FRAME_NO_CONFIRM, TRUE,
```

F/5

```
                          XV_LABEL, label,
                          0);

sdpy = (Display *)XV_DISPLAY_FROM_WINDOW(frame);

set_colormap();

(void) notify_interpose_event_func(frame, frame_proc, NOTIFY_SAFE);

/* construct panel */
   panel = xv_create(frame,PANEL,
                     WIN_COLUMNS, 3,
                     0);

xv_create(panel,PANEL_BUTTON,
             XV_Y, xv_row(panel, 0), XV_X, xv_col(panel, 0),
             PANEL_LABEL_STRING, "Quit",
             PANEL_NOTIFY_PROC, done,
             0);

xv_create(panel,PANEL_BUTTON,
             XV_Y, xv_row(panel, 0), XV_X, xv_col(panel, 6),
             PANEL_LABEL_STRING, "Resize",
             PANEL_NOTIFY_PROC, resize_proc,
             0);

xv_create(panel,PANEL_BUTTON,
             XV_Y, xv_row(panel, 0), XV_X, xv_col(panel, 14),
             PANEL_LABEL_STRING, "Zoom",
             PANEL_NOTIFY_PROC, zoom_proc,
             0);

xv_create(panel,PANEL_BUTTON,
             XV_Y, xv_row(panel, 0), XV_X, xv_col(panel, 21),
             PANEL_LABEL_STRING, "Options",
             PANEL_NOTIFY_PROC, options_proc,
             0);

xv_create(panel,PANEL_BUTTON,
             XV_Y, xv_row(panel, 1), XV_X, xv_col(panel, 21),
             PANEL_LABEL_STRING, "Period",
             PANEL_NOTIFY_PROC, period_proc,
             0);

xv_create(panel,PANEL_BUTTON,
             XV_Y, xv_row(panel, 1), XV_X, xv_col(panel, 14),
             PANEL_LABEL_STRING, "Add",
             PANEL_NOTIFY_PROC, accum_proc,
             0);

xv_create(panel,PANEL_BUTTON,
             XV_Y, xv_row(panel, 1), XV_X, xv_col(panel, 7),
             PANEL_LABEL_STRING, "Grab",
             PANEL_NOTIFY_PROC, grab_proc,
             0);

{
     int i;
     for (i=0; i < 2; i++)
       message_item[i] =
         xv_create(panel,PANEL_MESSAGE,
                   XV_Y, xv_row(panel, i+2), XV_X, xv_col(panel, 0),
                   PANEL_LABEL_STRING, "                                        ",
                   0);
   }
```

```
  window_fit(panel);

/* construct (hidden) zoom_frame */
  strcpy(label, "Zoom: ");
  strcat(label, fname);
  zoom_frame = xv_create(frame, FRAME,
                         WIN_SHOW, FALSE,
                         XV_LABEL, label,
                         FRAME_SHOW_LABEL, TRUE,
                         0);

/* construct Zoom canvas */
  Zoom = xv_create(zoom_frame,CANVAS,
                   CANVAS_WIDTH, ZOOM_SIZE,
                   CANVAS_HEIGHT,ZOOM_SIZE,
                   XV_WIDTH,ZOOM_SIZE,
                   XV_HEIGHT,ZOOM_SIZE,
                   CANVAS_AUTO_SHRINK, FALSE,
                   CANVAS_AUTO_EXPAND, FALSE,
                   CANVAS_X_PAINT_WINDOW, TRUE,
                   CANVAS_REPAINT_PROC, repaint_zoom,
                   WIN_DYNAMIC_VISUAL, TRUE,
                   0);

/* construct gray panel */
  num_zoom = xv_create(zoom_frame, CANVAS,
                   XV_X, 0,
                   XV_Y, xv_get(Zoom, XV_HEIGHT)+1,
                   XV_HEIGHT, ZOOM_SIZE,
                   XV_WIDTH,  ZOOM_SIZE,
                   CANVAS_REPAINT_PROC, repaint_zoom,
                   CANVAS_AUTO_SHRINK, FALSE,
                   CANVAS_AUTO_EXPAND, FALSE,
                   0);

xv_set(canvas_paint_window(Zoom), WIN_CMS, fgtool_cms, 0);
  xv_set(canvas_paint_window(num_zoom), WIN_CMS, fgtool_cms, 0);

/* construct main canvas */
  main_canvas = xv_create(frame, CANVAS,
                   XV_X, 0,
                   XV_Y, xv_get(panel, XV_HEIGHT)+1,
                   CANVAS_AUTO_SHRINK, FALSE,
                   CANVAS_AUTO_EXPAND, FALSE,
                   WIN_DYNAMIC_VISUAL, TRUE,
                   CANVAS_RETAINED, FALSE,
                   CANVAS_REPAINT_PROC, repaint_main,
                   CANVAS_X_PAINT_WINDOW, TRUE,
                   CANVAS_CMS_REPAINT, TRUE,
                   0);

vs = xv_create(main_canvas, SCROLLBAR,
                 SCROLLBAR_DIRECTION, SCROLLBAR_VERTICAL,
                 0);

hs = xv_create(main_canvas, SCROLLBAR,
                 SCROLLBAR_DIRECTION, SCROLLBAR_HORIZONTAL,
                 0);

scrollbar_width =xv_get(vs, XV_WIDTH) + 2;
  xv_set(main_canvas,
         CANVAS_WIDTH, x_size,
         CANVAS_HEIGHT, y_size,
         XV_WIDTH, min(ROHAV, x_size+scrollbar_width),
         XV_HEIGHT, min(GOVA, y_size+scrollbar_width),
```

```
          0);

xv_set(canvas_paint_window(main_canvas),
         WIN_EVENT_PROC, pos,
         WIN_CMS, fgtool_cms,
         WIN_CONSUME_EVENTS, LOC_MOVE, 0,
         0);

show_grays((PIXEL *)NULL);    /* initialize gray window */ window_fit(zoom_frame);
  window_fit(frame);
  xv_set(panel, XV_WIDTH, (int)xv_get(frame, XV_WIDTH), 0);
  xv_set(main_canvas, XV_WIDTH, (int)xv_get(frame, XV_WIDTH), 0);

/******************************************************************/
/* construct (hidden) options_frame */
  strcpy(label, "Options frame ");
  options_frame = xv_create(frame, FRAME,
                            WIN_SHOW, FALSE,
                            XV_LABEL, label,
                            XV_WIDTH, xv_get(frame, XV_WIDTH),
                            FRAME_SHOW_LABEL, TRUE,
                            0);

/* construct gray panel */
  options_panel = xv_create(options_frame,PANEL,
                            XV_WIDTH, xv_get(panel, XV_WIDTH),
                            0);

fname_item =
    xv_create(options_panel,PANEL_TEXT,
              XV_Y, xv_row(options_panel, 0), XV_X, xv_col(options_panel, 0),
              PANEL_LABEL_STRING,"Load file: ",
              PANEL_VALUE,fname,
              PANEL_VALUE_DISPLAY_LENGTH, 20,
              PANEL_VALUE_STORED_LENGTH,  150,
              PANEL_NOTIFY_PROC, load_proc,
              0);

xv_create(options_panel,PANEL_BUTTON,
            XV_Y, xv_row(options_panel, 1), XV_X, xv_col(options_panel, 0),
            PANEL_LABEL_STRING, "Scan",
            PANEL_NOTIFY_PROC, scan_proc,
            0);

xv_create(options_panel,PANEL_BUTTON,
            PANEL_LABEL_STRING, "Next",
            PANEL_NOTIFY_PROC, next_proc,
            0);

xv_create(options_panel,PANEL_BUTTON,
            PANEL_LABEL_STRING, "Prev",
            PANEL_NOTIFY_PROC, prev_proc,
            0);

xv_create(options_panel,PANEL_BUTTON,
            PANEL_LABEL_STRING, "1st",
            PANEL_NOTIFY_PROC, first_proc,
            0);

xv_create(options_panel,PANEL_BUTTON,
            PANEL_LABEL_STRING, "Last",
            PANEL_NOTIFY_PROC, last_proc,
            0);
```

```
text_item[0]=
xv_create(options_panel,PANEL_TEXT,
          PANEL_LABEL_STRING, "Number of X Cells ",
          PANEL_VALUE,"26",
          PANEL_VALUE_DISPLAY_LENGTH,10,
          PANEL_NOTIFY_PROC,set_xcell,
          XV_X,20,
          XV_Y,100,
          0);
text_item[1]=
xv_create(options_panel,PANEL_TEXT,
          PANEL_LABEL_STRING, "Number of Y Cells ",
          PANEL_VALUE,"26",
          PANEL_VALUE_DISPLAY_LENGTH,10,
          PANEL_NOTIFY_PROC,set_ycell,
          XV_X,20,
          XV_Y,130,
          0);
text_item[2]=
  xv_create(options_panel,PANEL_TEXT,
          PANEL_LABEL_STRING, "Number of Averages:",
          PANEL_VALUE,"1",
          PANEL_VALUE_DISPLAY_LENGTH,10,
          PANEL_NOTIFY_PROC,set_avgnum,
          XV_X,20,
          XV_Y,160,
          0);
text_item[3]=
  xv_create(options_panel,PANEL_TEXT,
          PANEL_LABEL_STRING, "Cell Spacing:",
          PANEL_VALUE,"7",
          PANEL_VALUE_DISPLAY_LENGTH,10,
          PANEL_NOTIFY_PROC,set_cell_spacing,
          XV_X,20,
          XV_Y,190,
          0);
color_item=
  xv_create(options_panel,PANEL_CHOICE,
          PANEL_CHOICE_STRINGS,"Red","Green","Blue","White",NULL,
          PANEL_NOTIFY_PROC, selected_color,
          PANEL_VALUE,1,
          XV_X,20,
          XV_Y,220,
          NULL);

disp_item=
  xv_create(options_panel,PANEL_CHOICE,
          PANEL_CHOICE_STRINGS,"Clear","Grid","Rect",NULL,
          PANEL_NOTIFY_PROC, selected_disp,
          PANEL_VALUE,1,
          XV_X,20,
          XV_Y,250,
          NULL);

xv_create(options_panel,PANEL_SLIDER,
          PANEL_LABEL_STRING, "Pc Gray Level:",
          PANEL_VALUE,255,
          PANEL_MIN_VALUE,0,
          PANEL_MAX_VALUE,255,
          PANEL_SLIDER_WIDTH,50,
          PANEL_TICKS,5,
          PANEL_NOTIFY_PROC,set_pc_gl,
```

FIG. F/8

```
                XV_X,20,
                XV_Y,280,
                0);

window_fit(options_panel);
    window_fit(options_frame);

}

/*****************************************************************/
set_colormap()
{
    Pixwin *pw;
    Xv_singlecolor fgtool_color[65];
    Xv_Screen screen = (Xv_Screen)xv_get(frame, XV_SCREEN);
    register int i;

for(i=0; i < 64; i++)
        fgtool_color[i].red = fgtool_color[i].green = fgtool_color[i].blue = i<<2;

fgtool_color[64].red = 255;
    fgtool_color[64].green = 150;
    fgtool_color[64].blue = 150;

fgtool_cms = (Cms)xv_find(screen, CMS,
                              CMS_NAME, "e65",
                              XV_AUTO_CREATE, FALSE,
                              0);

if (!fgtool_cms)
        fgtool_cms = (Cms)xv_create(screen, CMS,
                                    CMS_TYPE, XV_DYNAMIC_CMS,
                                    CMS_SIZE, 65,
                                    CMS_COLORS, fgtool_color,
                                    CMS_NAME, "e65",
                                    0);

(void)xv_get(fgtool_cms, CMS_X_COLORS, gray_color);

}

/*****************************************************************/
draw()
{
    mem2pr_gray(image, x_size, y_size);
}

/*****************************************************************/
/*****************************************************************/
mem2pr_gray(m,x_size,y_size)
     PIXEL *m;
     int x_size,y_size;
{
    PIXEL *m_1,*p_1;
    Pixrect *p = color_pr;
    int i,j;
    unsigned long *index;
```

```
    index = (unsigned long *)xv_get(fgtool_cms, CMS_INDEX_TABLE);

for(m_1=m,
        p_1 = (PIXEL *)(mpr_d(p)->md_image),
        i=y_size;
        i>0 ;
        i--,
        p_1+=mpr_d(p)->md_linebytes,
        m_1+=x_size
        )
      for(j=0;j<x_size;j++)
        p_1[j] = index[m_1[j]>>2];
}

/*******************************************************************/
done()
{
  exit(0);
}

/*******************************************************************/
pos(window, event)
     Xv_Window window;
     Event *event;
{
  int x = event_x(event), y = event_y(event);
  static int zoom_lock = FALSE;
  Event pending_event;

/* period input */
  if (period_point && event_is_down(event) && event_id(event) == MS_LEFT)
    get_period(x, y);

/* test zoom lock */
  if ( event_ctrl_is_down(event) && event_is_up(event))
    if (event_id(event) == MS_LEFT) /* lock it */
      zoom_lock = TRUE;
    else
      if (event_id(event) == MS_RIGHT) /* unlock it */
        zoom_lock = FALSE;

/* test if newer events are pending (a problem!! eats repaint events!!) */
  while (window ==
         xv_input_readevent(window, &pending_event, FALSE, FALSE, NULL))
    *event = pending_event;

x = event_x(event);y = event_y(event);

if (!xv_get(zoom_frame, WIN_SHOW))
    {
      sprintf(msg,"x=%3d y=%3d ", x, y);
      show_msg(1, msg, FALSE);
      return;
    } xv_set(message_item[1], PANEL_LABEL_STRING, " ", 0);
  zoom_de_image(window, event, zoom_lock); /* new place or last place */

}
```

```
/***********************************************************************/
show_msg(row, s, bell)              /* display a message in message window */
      int row;
      char *s;                      /* the message to display */
      int bell;                     /* ring window bell if true */
{ xv_set(message_item[row], PANEL_LABEL_STRING, s, 0);
  XFlush(sdpy);
  if (bell)                         /* ring the bell */
    {
       window_bell(panel); XFlush(sdpy);
       window_bell(panel); XFlush(sdpy);
       window_bell(panel); XFlush(sdpy);
    }
}                                   /* end of show_msg() */

/***********************************************************************/
show_grays(iptr)
      PIXEL *iptr;
{
  static Display   *dpy;
  static Window    xwin;
  static GC        fgc;
  static XGCValues gcvals;
  static Xv_Font   gray_font;
  static           line_height, pix_width, line_cnt, pix_cnt;
  static           halfx, halfy;
  static unsigned long black, white, xor_val;

int    x0, y0, i, j;
  char   s1[7], s[200];

if (!image) return;

if (!dpy)                  /* init */
    {
      dpy =  (Display *)xv_get(num_zoom, XV_DISPLAY);
      xwin = (Window)xv_get(canvas_paint_window(num_zoom), XV_XID);
      gray_font = (Xv_Font)xv_find(NULL, FONT,
                                   FONT_FAMILY, FONT_FAMILY_DEFAULT_FIXEDWIDTH,
                                   FONT_STYLE,  FONT_STYLE_NORMAL,
                                   0);

pix_width = xv_get(gray_font, FONT_DEFAULT_CHAR_WIDTH)*4;
      pix_cnt  = (xv_get(num_zoom, XV_WIDTH)+2)/pix_width;
      line_height = (int)xv_get(gray_font, FONT_DEFAULT_CHAR_HEIGHT)+3;
      line_cnt = (xv_get(num_zoom, XV_HEIGHT)+2)/line_height;
      halfx = pix_cnt/2; halfy=line_cnt/2;

gcvals.font = (Font)xv_get(gray_font, XV_XID);
      gcvals.background = black = BlackPixel(dpy, DefaultScreen(dpy));
      gcvals.foreground = white = WhitePixel(dpy, DefaultScreen(dpy));
      gcvals.graphics_exposures = FALSE;
      fgc=XCreateGC(dpy, xwin,
              GCForeground | GCBackground | GCFont | GCGraphicsExposures,
              &gcvals);
```

```
      xor_val = white ^ *(unsigned long *)xv_get(canvas_paint_window(num_zoom),
                                                 WIN_X_COLOR_INDICES);
    }

/* show values */
  XClearWindow(dpy, xwin);
  XFlush(sdpy);
  x0 = (iptr-image)%x_size-halfx;
  y0 = (iptr-image)/x_size-halfy;

XSetFunction(dpy, fgc, GXcopy);
  XSetForeground(dpy, fgc, white);

for (j=0, iptr-=halfy*x_size+halfx; j < line_cnt;
       j++, iptr+=x_size, y0++, x0-=pix_cnt)
    {
      strcpy(s,"");
      for (i=0; i < pix_cnt; i++,x0++)
        if (x0>=0 && x0<x_size && y0>=0 && y0<y_size)
          {
            /* now if accumulation process is over we display intensity */
            if ((show_gray_flag)&&(ZOOM_INTENSITY))
              sprintf(s1,"%3d ",(int)final_buf[i+(int)(iptr-image)]);
            else
              sprintf(s1,"%3d ",iptr[i]);
            strcat(s, s1);
          }
        else
          strcat(s,"    ");

XDrawString(dpy, xwin, fgc, 0, j*line_height, s, strlen(s)+1);
    }

XSetForeground(dpy, fgc, xor_val);
  XSetFunction(dpy, fgc, GXxor);
  XFillRectangle(dpy, xwin, fgc,
                 halfx*pix_width-2, (halfy-1)*line_height+3,
                 pix_width, line_height);
  XFlush(dpy);

}

/**********************************************************************/
resize_proc(item, event)
     Panel_item item;
     Event *event;
{
  int large_width = min(x_size, 1000), large_height = min(y_size, 750);
  int small_width = min(large_width, ROHAV);
  int small_height = min(large_height, GOVA);
  int add_width, add_height;
  Rect frame_rect, *view_rect;

show_msg(1, " ", FALSE);
  view_rect = (Rect *)xv_get(main_canvas, CANVAS_VIEWABLE_RECT,
                             canvas_paint_window(main_canvas));
  if (view_rect->r_width - small_width + view_rect->r_height - small_height >
      large_width - view_rect->r_width + large_height - view_rect->r_height)
    {                                /* shrink */
      add_width = small_width - view_rect->r_width;
```

```
         add_height = small_height - view_rect->r_height;
      }
   else                              /* expand */
      {
         add_width = large_width - view_rect->r_width;
         add_height = large_height - view_rect->r_height;
      } xv_set(main_canvas,
          XV_WIDTH, add_width + xv_get(main_canvas, XV_WIDTH),
          XV_HEIGHT, add_height + xv_get(main_canvas, XV_HEIGHT),
          0);

window_fit(panel);
   window_fit(frame);
   xv_set(panel, XV_WIDTH, (int)xv_get(frame, XV_WIDTH), 0);

}

/*********************************************************************/
iconize()
{
  PIXEL *m_l,*p_l;
  static Pixrect *p = NULL;
  int i,j,k,tmp;
  int size = min(x_size, y_size);
  int ystep = x_size*(size/64), xstep = size/64;
  static Icon icon;

if (!p)
     p = mem_create(64,64,8); /* icon pixrect */
  for(m_l=image, p_l = (PIXEL *)(mpr_d(p)->md_image), i=64;
       i>0 ;
       i--, p_l+=mpr_d(p)->md_linebytes, m_l+=ystep)
     for(j=k=0;j<64;j++, k+=xstep)
        {
          tmp = ((int)m_l[k-1])+m_l[k]+m_l[k]+m_l[k+1];
          if (i==1 || i==64 || j==0 || j==63)
            p_l[j]=63;
          else
            p_l[j] = tmp>>4;
        } if (!icon)
    icon =
       (Icon)xv_create(NULL, ICON,
                       ICON_IMAGE, p,
                       WIN_DYNAMIC_VISUAL, TRUE,
                       WIN_CMS, fgtool_cms,
                       0);

xv_set(frame, FRAME_ICON, icon, 0);

}

/*********************************************************************/
zoom_proc()
{
  int show = (int)xv_get(zoom_frame, WIN_SHOW);
```

```
    Rect main_rect, zoom_rect;    /* bounding rects of frames */ if (show)                     /* remove */
       {
          xv_set(zoom_frame, WIN_SHOW, FALSE, 0);
          return;
       }
    else                          /* display */
       {
          frame_get_rect(frame, &main_rect);
          frame_get_rect(zoom_frame, &zoom_rect);
          zoom_rect.r_top = main_rect.r_top;
          zoom_rect.r_left = main_rect.r_left + main_rect.r_width;

frame_set_rect(zoom_frame, &zoom_rect);
          xv_set(zoom_frame, WIN_SHOW, TRUE, 0);
       } show_msg(1, " ", FALSE);

}

/**********************************************************************/
options_proc()
{
   int show = (int)xv_get(options_frame, WIN_SHOW);
   Rect main_rect, options_rect; /* bounding rects of frames */ if (show)                     /* remove */
      {
         xv_set(options_frame, WIN_SHOW, FALSE, 0);
         return;
      }
   else                          /* display */
      {
         frame_get_rect(frame, &main_rect);
         frame_get_rect(options_frame, &options_rect);
         options_rect.r_top = main_rect.r_top+main_rect.r_height;
         options_rect.r_left = main_rect.r_left;
         options_rect.r_width = main_rect.r_width;

frame_set_rect(options_frame, &options_rect);
         xv_set(options_frame, WIN_SHOW, TRUE, 0);
      } show_msg(1, " ", FALSE);

}

/**********************************************************************/
/* notify proc when the main frame is opened or closed.               */
/**********************************************************************/
static Notify_value frame_proc(frame, event, arg, type)
     Frame frame;
     Event *event;
     Notify_arg arg;
     Notify_event_type type;
{
  Xv_Window W;
  int w, new state;
```

```
  static int sub_windows_state[32], self_state = FALSE;
  Notify_value value;

value = notify_next_event_func(frame, event, arg, type);
                              /* call actual notify procedure */ new_state = (int) xv_get(frame, FRAME_CLOSED);

if (self_state != new_state)   /* a change in state */
    if (new_state)               /* closing main frame */
      for (w = 1; W = (Xv_Window) xv_get(frame, FRAME_NTH_SUBFRAME, w); w++)
        {                        /* record current state of sub-windows */
          sub_windows_state[w] = (int) xv_get(W, WIN_SHOW);
          (void) xv_set(W, WIN_SHOW, FALSE, 0);
        }
    else                         /* opening main frame */
      for (w = 0; W = (Xv_Window) xv_get(frame, FRAME_NTH_SUBFRAME, w); w++)
        (void) xv_set(W, WIN_SHOW, sub_windows_state[w], 0);

self_state = new_state;        /* for next call */
  return value;
}                                /* end of frame_proc() */

/********************************************************************/
load_proc()                      /* reread a file */
{
  int  xs=x_size, ys=y_size;

if (image)
    {
      free(image);
      image = NULL;
    } show_msg(1, " ", FALSE);

strcpy(fname, (char *)panel_get_value(fname_item));
  if(*fname == '\0' ||
     !read_pic(fname,&image,&y_size,&x_size))
    {
      sprintf(msg, " cannot read file %s",fname);
      show_msg(0, msg, TRUE);
      return;
    } resize_image(&image,ZOOM_FACTOR);
  x_size*=4;
  y_size*=4;

if (color_pr) pr_destroy(color_pr);
  if (ximage!=NULL) {
    ximage->data = 0;            /* required by XDestroyImage */
    XDestroyImage(ximage);
  }
  ximage = 0;
  color_pr = mem_create(x_size, y_size, 8);

if (xs!=x_size || ys != y_size)
    {
      int width;

window_fit(panel);
      width = xv_get(panel, XV_WIDTH);
      if (x_size > width)
```

```
        width = min(x_size+scrollbar_width,  ROHAV);
    xv_set(main_canvas,
           CANVAS_WIDTH, x_size,
           CANVAS_HEIGHT, y_size,
           0);

window_fit(frame);
    xv_set(panel, XV_WIDTH, (int)xv_get(frame, XV_WIDTH), 0);

if (xv_get(zoom_frame, XV_SHOW)) /* hide & redisplay */
       {
          xv_set(zoom_frame, XV_SHOW, FALSE, 0);
          zoom_proc();
       }
    if (xv_get(options_frame, XV_SHOW)) /* hide & redisplay */
       {
          xv_set(options_frame, XV_SHOW, FALSE, 0);
          options_proc();
       }
  }

XFlush((Display *)xv_get(Zoom, XV_DISPLAY));
  strcpy(msg, "LCD TOOL ");
  strcat(msg, fname);
  xv_set(frame, XV_LABEL, msg,  0);

zoom_de_image(Zoom, (Event *)NULL, TRUE); /* zoom on locked coordinates */
  iconize();
  draw();
  paint_main_canvas();

}

/***********************************************************************/
repaint_main(canvas, pw, dpy, xwin, area)
      Canvas       canvas;
      Xv_Window    pw;
      Display      *dpy;
      Window       xwin;
      Xv_xrectlist *area;
{
  XRectangle    *xrect;       /* a single rectangle */
  static GC gc;
  int i;
  unsigned long *index;
  XGCValues gcvals;

if (!image) return;

if(!ximage)                 /* initialize package */
    {
    XGCValues gcvals;

ximage = XCreateImage(dpy,DefaultVisual(dpy,0),8,ZPixmap,0,
      mpr_d(color_pr)->md_image,color_pr->pr_size.x,color_pr->pr_size.y,
      64, mpr_d(color_pr)->md_linebytes);

ximage->byte_order = ximage->bitmap_bit_order = MSBFirst;
    ximage->bits_per_pixel = 8;

gcvals.graphics_exposures = False;
```

```
    gc = XCreateGC(dpy,xwin,GCGraphicsExposures,&gcvals);
    sdpy=dpy;                    /* set static dpy variable */
  } if (!area)
    return;

for (i=area->count, xrect = area->rect_array; i>0; i--, xrect++)
    XPutImage(dpy,xwin,gc,ximage,
              xrect->x, xrect->y,
              xrect->x, xrect->y,
              xrect->width, xrect->height);

if (corner_x2!=0) {
    index = (unsigned long *)xv_get(fgtool_cms, CMS_INDEX_TABLE);
    dpy = (Display *)XV_DISPLAY_FROM_WINDOW(frame);
    xwin=(Window)xv_get(canvas_paint_window(main_canvas),XV_XID);
    gc = DefaultGC(dpy,DefaultScreen(dpy));
    gcvals.graphics_exposures = False;
    XChangeGC(dpy,gc,GCGraphicsExposures,&gcvals);
    XSetFunction(dpy,gc,GXcopy);
    XSetForeground(dpy,gc,index[64]);

XDrawArc(dpy,xwin,gc,corner_x1-3,corner_y1-3,6,6,0,360*64);
    XDrawArc(dpy,xwin,gc,corner_x2-3,corner_y2-3,6,6,0,360*64);
    XDrawArc(dpy,xwin,gc,corner_x3-3,corner_y3-3,6,6,0,360*64);
    XDrawArc(dpy,xwin,gc,corner_x4-3,corner_y4-3,6,6,0,360*64);
  }
}

/*********************************************************************/
repaint_zoom(canvas, pw, dpy, xwin, area)
    Canvas          canvas;
    Xv_Window       pw;
    Display         *dpy;
    Window          xwin;
    Xv_xrectlist    *area;
{
  zoom_de_image(canvas, (Event *)NULL, TRUE); /* zoom on locked coordinates */
}

/*********************************************************************/
paint_main_canvas()            /* adjust programmed call to notifier call */
{
  Xv_xrectlist area;
  Xv_Window pw = canvas_paint_window(main_canvas);
  XRectangle rect;

rect = *(XRectangle *)xv_get(main_canvas, CANVAS_VIEWABLE_RECT, pw);

if (rect.x+rect.width > x_size)
    rect.width = x_size-rect.x;

if (rect.y+rect.height > y_size)
    rect.height = y_size-rect.y;

area.count = 1;
```

```
   area.rect_array[0] = rect;

repaint_main(main_canvas, pw,
             (Display *)xv_get(main_canvas, XV_DISPLAY),
             (Window)xv_get(pw, XV_XID), &area);
}

/**********************************************************************/
scan_proc()
{
   char *p = (char *)scan_files("", (char *)panel_get_value(fname_item));
   if (p)
     panel_set_value(fname_item, p);
   else
     show_msg(0, "Cannot scan directory", TRUE);
} next_proc()
{
   char *p = (char *)scan_next();
   if (p)
     {
        panel_set_value(fname_item, p);
        load_proc();
     }
   else
     show_msg(0, "no next file ", TRUE);
} prev_proc()
{
   char *p = (char *)scan_prev();
   if (p)
     {
        panel_set_value(fname_item, p);
        load_proc();
     }
   else
     show_msg(0, "no prev file ", TRUE);
} first_proc()
{
   char *p = (char *)scan_first();
   if (p)
     {
        panel_set_value(fname_item, p);
        load_proc();
     }
   else
     show_msg(0, "no first file ", TRUE);
} last_proc()
{
   char *p = (char *)scan_last();
   if (p)
     {
        panel_set_value(fname_item, p);
```

```
       load_proc();
     }
   else
     show_msg(0, "no last file ", TRUE);
}

/*********************************************************************/
clear_canvas(canvas)
     Canvas canvas;
{
  pw_writebackground((Pixwin *)canvas_pixwin(canvas),
                    0, 0,
                    (int)xv_get(canvas, CANVAS_WIDTH),
                    (int)xv_get(canvas, CANVAS_HEIGHT),
                    PIX_CLR);
}

/*********************************************************************/
#define UNC    5               /* uncertainty distance */
#define UNC2   (2*UNC+1)
#define MARGIN 5               /* leave off some margin */
#define MARG2  (2*MARGIN)

/*********************************************************************/
float calc_period(buf1, buf2, len)
     int *buf1, *buf2, len;
{
  int i,j,k;
  double norm;                 /* norm of first vector (sum, in this case) */
  double val, res[UNC2];       /* result of correlation- +/- UNC */
  float df,dg,ff,fg;
  float shift;                 /* determined shift */
  float sig;                   /* significance measure */ for (norm=j=0; j<len; j++)
    norm += buf1[j-UNC];
  sig = 10000/norm;            /* 30 gray levels X 10 pix */
  for (i=-UNC; i<=UNC; i++)
    {
      for (val=j=0; j<len; j++)
        val += ((double)buf1[j+i])*buf2[j];
      res[i+UNC] = val/norm;
      norm += (buf1[len+i]-buf1[i]);
    } for (i=1, val=res[k=0]; i<UNC2; i++)
    if (res[i]>val)
      val=res[k=i];

if (k<UNC-3 || k>UNC+3 ||
      res[k-2]>res[k-1]-sig ||
      res[k-1]>res[k]-sig ||
      res[k+1]>res[k]-sig ||
      res[k+2]>res[k+1]-sig)
    {
      show_msg(0, "bad period, try again", TRUE);
      return -1;
    } if (res[k-1]>res[k+1])       /* choose pair for interpolation */
```

```
      k--;
   k-=UNC;

for (i=0, ff=fg=0; i<len; i++)
      {
         df=buf1[i+k+1]-buf1[i+k];
         dg=buf1[i+k]-buf2[i];
         ff+=df*df;
         fg+=df*dg;
      } shift = k - fg/ff;
   return shift;
}

/****************************************************************************/
int period_proc()
{
  period_point = 1;
  show_msg(0, " Mark Upper Left Point", FALSE);
}

/****************************************************************************/
int get_period(x,y)
      int x,y;
{
  int i, j, k, l, n;
  int lenx, leny, len;          /* correlation lengths */
  int prdx, prdy;               /* presumed periods */
  float xpx, xpy, ypx, ypy;     /* x-period (x&y), y-period(x&y) */
  int *proj1, *proj2;           /* h/v projections */
  PIXEL *ptr;
  double d1,d2,d3,d4;
  double cntx,cnty;
  double tanalfa,sinalfa,cosalfa;
  unsigned long *index;

switch (period_point) {
  case 1 :
    corner_x1=(double)x,corner_y1=(double)y;
    show_msg(0, " Mark Upper Right Point", FALSE);
    period_point=2;
    return;
  case 2 :
    corner_x2=(double)x,corner_y2=(double)y;
    period_point=3;
    show_msg(0, " Mark Lower Right Point", FALSE);
    return;
  case 3 :
    corner_x3=(double)x,corner_y3=(double)y;
    period_point=4;
    show_msg(0, " Mark Lower Left Point", FALSE);
    return;
  case 4 :
    corner_x4=(double)x,corner_y4=(double)y;
    period_point=0;
    show_msg(0, "", FALSE);
    break;
    default :
       printf ("In strange place in case statement\n");
  }
  index = (unsigned long *)xv_get(fqtool_cms, CMS_INDEX_TABLE);
```

```
  fine_tune(&corner_x1,&corner_y1);
  fine_tune(&corner_x2,&corner_y2);
  fine_tune(&corner_x3,&corner_y3);
  fine_tune(&corner_x4,&corner_y4);

d1=(corner_x1-corner_x2)*(corner_x1-corner_x2)+(corner_y1-corner_y2)*(corner_y:
  d1=sqrt(d1);
  d2=(corner_x3-corner_x4)*(corner_x3-corner_x4)+(corner_y3-corner_y4)*(corner_y:
  d2=sqrt(d2);

d3=(corner_x2-corner_x3)*(corner_x2-corner_x3)+(corner_y2-corner_y3)*(corner_y:
  d3=sqrt(d3);
  d4=(corner_x1-corner_x4)*(corner_x1-corner_x4)+(corner_y1-corner_y4)*(corner_y:
  d4=sqrt(d4);

sqr_ratio=(d1+d2)/(d3+d4);

line_pix_ratio=0.5*(d1/(double)(xcell-1)+d2/(double)(xcell-1));
  row_pix_ratio=0.5*(d3/(double)(ycell-1)+d4/(double)(ycell-1));

printf ("Pix ratio : Line %lf   Row %lf\n",line_pix_ratio,row_pix_ratio);

if (corner_x2!=corner_x1) tanalfa=-(corner_y2-corner_y1)/(corner_x1-corner_x2);
  if (corner_y2!=corner_y3) tanalfa+=(corner_x2-corner_x3)/(corner_y3-corner_y2);
  tanalfa/=2.0;

alfa=atan(tanalfa);
  sinalfa=sin(alfa);
  cosalfa=cos(alfa);

deltax=line_pix_ratio*cosalfa;
  deltay=line_pix_ratio*sinalfa;
/*
  if (corner_y3!=corner_y4) tanalfa=-(corner_y4-corner_y3)/(corner_x3-corner_x4);
  if (corner_y4!=corner_y1) tanalfa+=(corner_x1-corner_x4)/(corner_y4-corner_y1);
  tanalfa/=2.0;

alfa=atan(tanalfa);
  sinalfa=sin(alfa);
  cosalfa=cos(alfa);

deltax=row_pix_ratio*cosalfa;
  deltay=row_pix_ratio*sinalfa;
*/
  dx=0;
  dy=0;

dx+=(corner_x2-corner_x1-deltax*(xcell-1));
  dx+=(corner_x4-corner_x1+sqr_ratio*deltay*(xcell-1));
  dx+=(corner_x3-corner_x1-(deltax*(xcell-1)-deltay*(xcell-1)/sqr_ratio));

dy+=(corner_y4-corner_y1-deltax*(xcell-1)/sqr_ratio);
  dy+=(corner_y2-corner_y1-deltay*(xcell-1));
  dy+=(corner_y3-corner_y1-(deltax*(ycell-1)/sqr_ratio+deltay*(xcell-1)));

dx/=4;
  dy/=4;

xv_set(main_canvas,XV_SHOW,FALSE,0);
  XFlush(sdpy);
  for (n=0;n<ycell;n++)
    for (cntx=corner_x1+dx-n*deltay,cnty=corner_y1+dy+n*deltax/sqr_ratio;
         cntx<=corner_x2-deltay*(double)n+2
         ;cntx+=deltax,cnty+=deltay) {
```

```c
      ximage->data[irint(cntx)+irint(cnty)*ximage->bytes_per_line]=index[64];
    }
  xv_set(main_canvas,XV_SHOW,TRUE,0);
  XFlush(sdpy);
}
/*********************************************************************/
write_buf(buf, len)
     int *buf, len;
{
  int i;

fprintf(stderr, "\n");
  for (i=0; i<len; i++)
    fprintf(stderr, "%d %d\n", i, buf[i]);
  fprintf(stderr, "\n");
}
/*********************************************************************/
void fine_tune(double *a,double *b)
{
  int i,j,maxx,maxy;
  unsigned char maxval;

maxval=0;
  maxx=(int)*a;
  maxy=(int)*b;

for (i=(int)*a-MARK_TOL;i<(int)*a+MARK_TOL;i++)
    for (j=(int)*b-MARK_TOL;j<(int)*b+MARK_TOL;j++)
      if (image[i+j*x_size]>maxval) {
        maxval=image[i+j*x_size];
        maxx=i;
        maxy=j;
      }

*a=maxx;
  *b=maxy;
}

/*********************************************************************/
void set_xcell(Panel_item item,Event *event)
{
  char str[80];
  xv_set(options_panel,PANEL_CARET_ITEM,text_item[1],0);
  strcpy(str,(char*)xv_get(item,PANEL_VALUE));
  xcell=(int)atof(str);
}
/*********************************************************************/
void set_ycell(Panel_item item,Event *event)
{
  char str[80];
  xv_set(options_panel,PANEL_CARET_ITEM,text_item[2],0);
  strcpy(str,(char*)xv_get(item,PANEL_VALUE));
  ycell=(int)atof(str);
}
/*********************************************************************/
void set_avgnum(Panel_item item,Event *event)
{
  char str[80];
  xv_set(options_panel,PANEL_CARET_ITEM,text_item[3],0);
  strcpy(str,(char*)xv_get(item,PANEL_VALUE));
  avgnum=(int)atof(str);
}
/*********************************************************************/
void set_cell_spacing(Panel_item item,Event *event)
{
  char str[80];
```

```c
  xv_set(options_panel,PANEL_CARET_ITEM,text_item[0],0);
  strcpy(str,(char*)xv_get(item,PANEL_VALUE));
  cell_spacing=(int)atof(str);
}
/******************************************************************/
void set_pc_gl(Panel_item item,Event *event)
{
  char str[80];
  pc_gl=xv_get(item,PANEL_VALUE);
  if (0==repaint_pc())
    show_msg(0, "Can Not Draw on Pc", TRUE);
}
/******************************************************************/
void accum_proc()
{
  int line_count,total_count;
  int i,j,n;
  int resultx,resulty;
  double posx,posy;
  double total;
  double dbltmp;
  double cntx,cnty;
  int hist[150];
  FILE *fp;

for (i=0;i<150;i++) hist[i]=0;
  result=malloc(xcell*ycell*sizeof(double));
  total=0;
  total_count=0;

if (ZOOM_INTENSITY)
    final_buf=(double*)calloc(x_size*y_size,sizeof(double));

resulty=0;
  for (n=0;n<ycell;n++)
    {
      resultx=0;
      line_count=0;
      for (cntx=corner_x1+dx-(double)n*deltay,
           cnty=corner_y1+dy+(double)n*deltax/sqr_ratio;
           cntx<=corner_x2-deltay*(double)n+2;
           cntx+=deltax,cnty+=deltay)
        {
          posx=irint(cntx);
          posy=irint(cnty);
          if (DYNAMIC_REG) {
            fine_tune(&posx,&posy);
            dbltmp=sum_all(posx,posy,line_pix_ratio/2);
            total+=dbltmp;
            if (ZOOM_INTENSITY)
              final_buf[irint(cntx)+irint(cnty)*x_size]=dbltmp;
          } else {
            dbltmp=sum_all(posx,posy,line_pix_ratio/2);
            total+=dbltmp;
            if (ZOOM_INTENSITY)
              final_buf[irint(cntx)+irint(cnty)*x_size]=dbltmp;
          }
          result[resulty*xcell+resultx]=dbltmp;
          resultx++;
          total_count++;
          line_count++;
        }
      resulty++;
    }
  strcpy(valsname,fname);
  strcat(valsname,".vals");
```

```c
  fp=fopen(valsname,"w");
  total/=(double)total_count;

for(i=0;i<xcell;i++)
    for(j=0;j<ycell;j++) {
       fprintf (fp,"%lf \n",result[i+xcell*j]);
       result[i+xcell*j]*=(1000.0/total);
       if (irint(result[i+xcell*j]/10)<150)
         hist[irint(result[i+xcell*j]/10)]++;
       else hist[149]++;
    }
  fclose(fp);

if (FIX_RESULTS_FLAG) fix_results();
/*
   fixing needs
   camera/panel ratio
   spacing
   angle
*/
  fp=fopen("/tmp/delme","w");
  for (i=0;i<150;i++) fprintf (fp,"%d %d \n",i,hist[i]);
  fclose(fp);
  system("xgraph /tmp/delme&");

show_gray_flag=1;
}
/*********************************************************************/
double sum_all(double xpos,double ypos,double length)
{
  int i,j;
  int int_start_x,int_start_y;
  int int_end_x,int_end_y;
  double sum=0;

int_start_x=irint(xpos-length);
  int_start_y=irint(ypos-length);
  int_end_x=int_start_x+irint(2*length);
  int_end_y=int_start_y+irint(2*length);

for (i=int_start_x;i<int_end_x;i++)
    for (j=int_start_y;j<int_end_y;j++)
      sum+=(double)image[i+j*x_size];

return sum;
}
/*********************************************************************/
void resize_image(PIXEL **cur_image,int zoom_factor)
{
  int i;
  for (i=0; i < ZOOM_FACTOR; i++)
    get_coefficients(resample[i],
                     ((double)(i%ZOOM_FACTOR))/(double)ZOOM_FACTOR);

/* get luts */
  for (i=0; i < ZOOM_FACTOR; i++)
    next_ind[i] = i+1;
  next_ind[ZOOM_FACTOR-1]=0;

for (i=0; i < ZOOM_FACTOR; i++)
    advance[i] = (i/ZOOM_FACTOR - (i-1)/ZOOM_FACTOR);
  if (ZOOM_FACTOR > 1)
    advance[0]++;                    /* problem with negative roundoff */
```

```
  newrows = y_size*ZOOM_FACTOR; newcols = x_size*ZOOM_FACTOR;
  rows = y_size; cols = x_size;

*cur_image = resampl(*cur_image);
}
/****************************************************************/
unsigned char *resampl(unsigned char *oldpic)
{
  int i,j,k,tmp, shul;
  int c1 = newcols, c2 = newcols*2, c3 = newcols*3;
  unsigned char *newpic = (unsigned char *)malloc((unsigned)(rows*newcols));
  unsigned char *oldptr, *newptr;
  unsigned char *limit;
  int *coef;

/* first, in x */
  for (i=0, oldptr = oldpic-1, newptr = newpic; i < rows;
       i++, newptr = newpic+newcols*i, oldptr = oldpic-1 + i*cols)
    {
      j = k = 0;
      limit = oldptr+1;
      while(oldptr < limit)     /* left shul */
        {
          coef = resample[k];
          *newptr = (oldptr[1]*coef[1]+ oldptr[2]*coef[2])/(coef[1]+coef[2]);
          j++, k = next_ind[k], oldptr += advance[k], newptr++;
        } for (limit = oldpic+cols*(i+1)-3; oldptr < limit; /* main job */
           j++, k = next_ind[k], oldptr += advance[k], newptr++)
        {
          coef = resample[k];
          tmp = oldptr[0]*coef[0] + oldptr[1]*coef[1] +
            oldptr[2]*coef[2] + oldptr[3]*coef[3];
          *newptr =
            tmp > (255<<8)  ?  255  : tmp < 0  ?  0  :  (tmp+128)>>8;
        } for (limit++; j < newcols; /* right shul */
           j++, k = next_ind[k], oldptr += advance[k], newptr++)
        {
          coef = resample[k];
          *newptr = (oldptr < limit)   ?
             (oldptr[1]*coef[1]+ oldptr[2]*coef[2])/(coef[1]+coef[2])   :
                newptr[-1];    /* shachpel last pixel */
        }

}

/* then in y */
  cols = newcols;
  for (i=0; i < ZOOM_FACTOR; i++)
    advance[i]*=cols;
  free((char *)oldpic);
  oldpic = newpic;
  newpic = (unsigned char *)malloc((unsigned)(newrows*cols));

for (i=0; i < cols; i++)
    {
      limit = oldpic+i, oldptr = limit-cols, newptr = newpic+i;
      j = k = 0;

while(oldptr < limit)     /* top shul */
        {
```

```
                coef = resample[k];
                *newptr = (oldptr[c1]*coef[1]+ oldptr[c2]*coef[2])/(coef[1]+coef[2]);
                j++, k = next_ind[k], oldptr += advance[k], newptr+=cols;
            } for (limit += cols*(rows-3); oldptr < limit; /* main job */
                j++, k=next_ind[k], oldptr+=advance[k], newptr+=cols)
            {
                coef = resample[k];
                tmp = oldptr[0]*coef[0] + oldptr[c1]*coef[1] +
                    oldptr[c2]*coef[2] + oldptr[c3]*coef[3];
                *newptr =
                    tmp > (255<<8)  ?  255  :  tmp < 0  ?  0  :  (tmp+128)>>8;
            } for (limit+=cols; j < newrows; /* bottom shul */
                j++, k = next_ind[k], oldptr += advance[k], newptr+= cols)
            {
                coef = resample[k];
                *newptr = (oldptr < limit)  ?
                    (oldptr[c1]*coef[1]+ oldptr[c2]*coef[2])/(coef[1]+coef[2])  :
                        newptr[-cols]; /* shachpel last pixel */
            }
     } free((char *)oldpic);
    return(newpic);
}

/*******************************************************************/
get_coefficients(lut, offset)
      int lut[4];              /* space for coefficients */
      double offset;
{
  double x;
  double alpha = -.5;          /* optimal, as claimed */
  double a, b, u,v,w;
  int extra;

a=alpha +2, b = -(alpha+3);
  u = -5*alpha, v=8*alpha, w=4*alpha;

/* lut is computed one way for 0 <=x <1 and another way for 1 <=x < 2. */
  x = offset+1;
  lut[0] =  (int)(256*(((alpha*x+u)*x+v)*x -w));
  x = 2-offset;
  lut[3] =  (int)(256*(((alpha*x+u)*x+v)*x -w));
  x = offset;
  lut[1] = (int)(256 * ((a*x+b)*x*x+1) + .5);
  x = 1-offset;
  lut[2] = (int)(256 * ((a*x+b)*x*x+1) + .5);

/* sum <-- 1 */
  extra = lut[0]+lut[1]+lut[2]+lut[3]-256;
  lut[1]-=extra;
}
/*******************************************************************/
grab_proc()                         /* grab a data cube image */
{
  int   xs=x_size, ys=y_size;

if ((image!=NULL)&&(first_grab!=0))
      {
        free(image);
```

```
      image = NULL;
  }
printf ("x=%d y=%d\n",x_size,y_size);
if (first_grab) {
  if (GOOD_GRAB!=grab_main(avgnum,&image,&x_size,&y_size,0,0,0,0)) {
    show_msg(1, "Grab Failed ", FALSE);
    return ;
  }
  printf ("x=%d y=%d\n",x_size,y_size);
  write_ubc_file("fromdc",image,y_size,x_size);
  resize_image(&image,ZOOM_FACTOR);
  x_size*=4;
  y_size*=4;
  printf ("x=%d y=%d\n",x_size,y_size);
  first_grab=0;
}
else {
  if (GOOD_GRAB!=grab_main(avgnum,&image,NULL,NULL,0,0,x_size/4,y_size/4)) {
    show_msg(1, "Grab Failed ", FALSE);
    return;
  }
  x_size/=4;
  y_size/=4;
  write_ubc_file("fromqc",image,y_size,x_size);
  printf("Xsize= %d Ysize=%d\n",x_size,y_size);
  resize_image(&image,ZOOM_FACTOR);
  x_size*=4;
  y_size*=4;
}
show_msg(1, " ", FALSE);

strcpy(fname,"grabbed");

if (color_pr) pr_destroy(color_pr);
if (ximage!=NULL) {
  ximage->data = 0;                    /* required by XDestroyImage */
  XDestroyImage(ximage);
}
ximage = 0;
color_pr = mem_create(x_size, y_size, 8);

if (xs!=x_size || ys != y_size)
  {
    int width;

window_fit(panel);
    width = xv_get(panel, XV_WIDTH);
    if (x_size > width)
      width = min(x_size+scrollbar_width,  ROHAV);
    xv_set(main_canvas,
           CANVAS_WIDTH, x_size,
           CANVAS_HEIGHT, y_size,
           0);

window_fit(frame);
    xv_set(panel, XV_WIDTH, (int)xv_get(frame, XV_WIDTH), 0);

if (xv_get(zoom_frame, XV_SHOW)) /* hide & redisplay */
      {
        xv_set(zoom_frame, XV_SHOW, FALSE, 0);
        zoom_proc();
      }
    if (xv_get(options_frame, XV_SHOW)) /* hide & redisplay */
      {
```

```
          xv_set(options_frame, XV_SHOW, FALSE, 0);
          options_proc();
        }
    }

XFlush((Display *)xv_get(Zoom, XV_DISPLAY));
  strcpy(msg, "Fgtool: ");
  strcat(msg, fname);
  xv_set(frame, XV_LABEL, msg, 0);

zoom_de_image(Zoom, (Event *)NULL, TRUE); /* zoom on locked coordinates */
  iconize();
  draw();
  paint_main_canvas();

}

/**********************************************************************/
void fix_results(void)
/*
   fixing needs
   camera/panel ratio
   spacing
   angle
*/
{
  int i,j;
  int *hcount;
  int incount;
  double teder,tanalfam,sinalfam,cosalfam;
  double offset,final_offset;
  double sum,maxsum;
  double mean=0;
  double *h;
  double cameravec,screenvec,mvec,mangle;
  double *f,*f1;
  double delta,a,b;
  double s,sx,sy,sxx,sxy,syy;
  FILE *fp;

h=calloc(2*ycell*cell_spacing,sizeof(double));
  f=calloc(xcell*ycell,sizeof(double));
  f1=calloc(xcell*ycell,sizeof(double));
  hcount=calloc(2*ycell*cell_spacing,sizeof(int));

cameravec=irint(row_pix_ratio/ZOOM_FACTOR);
  screenvec=row_pix_ratio/ZOOM_FACTOR;
  mvec=sqrt(cameravec*cameravec+screenvec*screenvec-
            2*cameravec*screenvec*cos(alfa));
  mangle=asin(screenvec*sin(alfa)/mvec);

teder=2/mvec;
  tanalfam=tan(mangle);
  sinalfam=sin(mangle);
  cosalfam=cos(mangle);

incount=0;
  for (i=0;i<xcell;i++)
    for (j=0;j<ycell;j++)
      if (
          irint((double)j*cell_spacing*cosalfam+
                (double)i*cell_spacing*sinalfam)>=0)
      {
        h[irint((double)j*cell_spacing*cosalfam+
                (double)i*cell_spacing*sinalfam)]
          +=(double)result[i+j*xcell];
```

```
      mean+=(double)result[i+j*xcell];
      hcount[irint((double)j*cell_spacing*cosalfam+
              (double)i*cell_spacing*sinalfam)]++;
      incount++;
    }
  mean/=(double)incount;

for (i=0;i<2*ycell*cell_spacing;i++) {
    if (hcount[i]!=0)
      h[i]/=(double)hcount[i];
    else h[i]=0;
  } fp=fopen("sinfile","w");
  for (i=0;i<2*ycell*cell_spacing;i++)
    fprintf (fp,"%d %lf \n",i,h[i]);
  fclose(fp);

printf("Freq. %lf\n",teder);
/*
  maxsum=0;
  for (offset=0;offset<2*Pi;offset+=Pi/20) {
    sum=0;
    for (i=0;i<2*ycell*cell_spacing;i++)
      if (h[i]!=0)
        sum+=sin(offset+(2*Pi*((double)i))/(teder*cell_spacing))*(h[i]-mean);

if (sum>maxsum){
      final_offset=offset;
      maxsum=sum;
    }
  }
*/
/*
  fp=fopen("offfile","w");
  for (i=0;i<2*ycell*cell_spacing;i++)
    fprintf (fp,"%d %lf\n",i,
             50*sin(final_offset+(2*Pi*((double)i))/(teder*cell_spacing)));
  fprintf(fp,"\n\n");
  for (i=0;i<2*ycell*cell_spacing;i++)
    fprintf (fp,"%d %lf\n",
             i,(h[i]-mean));

fclose(fp);
*/
  /* Now fit K*sin(theta) and (result-Mean) */
/*
  fp=fopen("corfile","w");
  for (j=0;j<ycell;j++)
    for (i=0;i<xcell;i++)
      {
        f[i+j*xcell]=(double)result[i+j*xcell]-mean;
        f1[i+j*xcell]=(double)
          sin((2*Pi*((double)j*cell_spacing*cosalfam+(double)i*cell_spacing*sina
        fprintf (fp,"%f %f \n",f[i+j*xcell],f1[i+j*xcell]);
      }
  fclose(fp);

s=sx=sy=sxx=syy=sxy;
  for (i=0;i<xcell*ycell;i++) {
    s++;
    sx+=f[i];
    sy+=f1[i];
    sxx+=f[i]*f[i];
    syy+=f1[i]*f1[i];
    sxy+=f[i]*f1[i];
```

```
  }
  delta=s*sxx-sx*sx;
  a=(sxx*sy-sx*sxy)/delta;
  b=(s*sxy-sx*sy)/delta;
*/
  strcpy(valsname,fname);
  strcat(valsname,".fixed");
  fp=fopen(valsname,"w");

for (i=0;i<xcell;i++)
    for (j=0;j<ycell;j++) {
/*
      result[i+j*xcell]-=(1/(2*b))*
         sin((2*Pi*((double)j*cell_spacing*cosalfam+
         (double)i*cell_spacing*sinalfam))/
         (teder*cell_spacing)+final_offset);
*/
      if ((h[irint((double)j*cell_spacing*cosalfam+
                  (double)i*cell_spacing*sinalfam)]!=0)&&
           (irint((double)j*cell_spacing*cosalfam+
              (double)i*cell_spacing*sinalfam)>=0))
         result[i+j*xcell]*=
           (1-(h[irint((double)j*cell_spacing*cosalfam+
                       (double)i*cell_spacing*sinalfam)]-mean)/mean);

fprintf(fp,"%lf\n",result[i+j*xcell]);
    }
  fclose(fp);

free(h);
  free(f);
  free(f1);
}
/*******************************************************************/ int selected_color(Panel_item item,Event *event)
{
  int val;

val=xv_get(item,PANEL_VALUE);
  if (val==0) pattern_color=RED;
  if (val==1) pattern_color=GREEN;
  if (val==2) pattern_color=BLUE;
  if (val==3) pattern_color=WHITE;
  if (0==repaint_pc())
    show_msg(0, "Can Not Draw on Pc", TRUE);
}
/*******************************************************************/ int selected_disp(Panel_item item,Event *event)
{
  int val;

val=xv_get(item,PANEL_VALUE);
  if (val==0) pattern_type=CLEAR;
  if (val==1) pattern_type=GRID;
  if (val==2) pattern_type=RECT;
  if (0==repaint_pc())
    show_msg(0, "Can Not Draw on Pc", TRUE);
}
/*******************************************************************/
int repaint_pc(void)
{
  int rc;
```

```
    if (pcfd==0) return(0);

if (pattern_color==RED)
      rc=remote_rgb( pcfd, 3, pc_gl, 0, 0 );
    if (pattern_color==GREEN)
      rc=remote_rgb( pcfd, 3, 0, pc_gl, 0 );
    if (pattern_color==BLUE)
      rc=remote_rgb( pcfd, 3, 0, 0, pc_gl );
    if (pattern_color==WHITE)
      rc=remote_rgb( pcfd, 3, pc_gl, pc_gl, pc_gl );

if (rc!=1) return rc;

if (pattern_type==CLEAR) {
      rc=remote_block( pcfd, 0, 0, 480, 640,0);
    }
    if (pattern_type==GRID) {
      rc=remote_block( pcfd, 0, 0, 480, 640,0);
      rc*=remote_grid(pcfd,230,150,180,180,cell_spacing,cell_spacing,3 );
    }
    if (pattern_type==RECT) {
      rc=remote_block( pcfd, 0, 0, 480, 640,0);
      rc*=remote_block( pcfd, 230, 150, 180, 180,3);
    }
    return rc;
}
```

```c
/**********************************************************************/
/*                                                                    */
/*                          resample                                  */
/*                                                                    */
/**********************************************************************/
/* This program resamples a UBC image                                 */
/**********************************************************************/

/* SCCS id string */
#ifndef lint
static char sccsid[] = "@(#)resample.c   1.3    3/2/92";
endif include <stdio.h>
include <math.h>

/***************** special functions declarations *****************/ define MAX_MAHZOR   8          /* maximum allowed length of a mahzor */
unsigned char *resampl();
extern char *strcpy(), *strncpy(), *strcat();
extern char *sprintf(), *strtok(), *strpbrk();
extern char *malloc(), *memcpy(), *memset();
extern void exit();

char *strstr();

/************************* definitions *************************/ define TRUE    1
define FALSE   0 define max(a,b) ((a) > (b) ? (a) : (b))
define err_return(s) { (void) strcpy(err_msg, s); return FALSE; }

/************************ global variables ************************/ char header[1025];                  /* image header */
unsigned char next_ind[MAX_MAHZOR]; /* cycle generator */
int advance[MAX_MAHZOR];            /* advance lut */
int resample[MAX_MAHZOR][4];        /* coefficient tables */
int rows, cols;                     /* image size */
int oldres, newres;                 /* image old and new resolution */
int newrows, newcols, mahzor;

/**********************************************************************/
/* This routine resamples input image.                                */
/**********************************************************************/ main(argc, argv)
    int argc;
    char **argv;
{
  char filename[100];
  int  i;
  unsigned char *pic = NULL;

if (argc != 3)
    {
      fprintf(stderr, "Usage: resample ubc-filename  new resolution \n");
      exit(0);
    }
```

```c
   (void) strcpy(filename, argv[1]);
   if (!read_ubc_file(filename, &pic, header))
     {
        fprintf(stderr, "Cannot open/read file %s", filename);
        exit(0);
     } newres = atoi(argv[2]);
   if (oldres <100)
     oldres = 250;

for (mahzor=1; mahzor <=MAX_MAHZOR; mahzor++)
     if ((oldres*mahzor) % newres  == 0) /* mahzor found */
       break;

if (mahzor > MAX_MAHZOR)
     {
        fprintf(stderr, "luakh lo mahzori, sorry! \n");
        exit (0);
     }
/* get luts */
   for (i=0; i < mahzor; i++)
     next_ind[i] = i+1;
   next_ind[mahzor-1]=0;

for (i=0; i < mahzor; i++)
     advance[i] = ((i*oldres)/newres) - (((i-1)*oldres)/newres);
   if (mahzor > 1)
     advance[0]++;                    /* problem with negative roundoff */ for (i=0; i < mahzor; i++)
     get_coefficients(resample[i], ((double)((i*oldres)%newres))/newres);

newrows = rows*newres/oldres; newcols = cols*newres/oldres;

/**********************************************/
   pic = resampl(pic);
/**********************************************/

(void) strcat(filename,".rsmpl");
   write_ubc_file(filename, pic, newrows, newcols);

return 0;
}

/*********************************************************************/
unsigned char *resampl(oldpic)
     unsigned char *oldpic;
{
   int i,j,k,tmp, shul;
   int c1 = newcols, c2 = newcols*2, c3 = newcols*3;
   unsigned char *newpic = (unsigned char *)malloc((unsigned)(rows*newcols));
   unsigned char *oldptr, *newptr;
   unsigned char *limit;
   int *coef;

/* first, in x */
   for (i=0, oldptr = oldpic-1, newptr = newpic; i < rows;
        i++, newptr = newpic+newcols*i, oldptr = oldpic-1 + i*cols)
     {
        j = k = 0;
        limit = oldptr+1;
        while(oldptr < limit)     /* left shul */
```

```
        {
          coef = resample[k];
          *newptr = (oldptr[1]*coef[1]+ oldptr[2]*coef[2])/(coef[1]+coef[2]);
          j++, k = next_ind[k], oldptr += advance[k], newptr++;
        } for (limit = oldpic+cols*(i+1)-3; oldptr < limit; /* main job */
             j++, k = next_ind[k], oldptr += advance[k], newptr++)
          {
            coef = resample[k];
            tmp = oldptr[0]*coef[0] + oldptr[1]*coef[1] +
              oldptr[2]*coef[2] + oldptr[3]*coef[3];
            *newptr =
              tmp > (255<<8)  ?  255  : tmp < 0  ?   0  :   (tmp+128)>>8;
          } for (limit++; j < newcols;  /* right shul */
             j++, k = next_ind[k], oldptr += advance[k], newptr++)
          {
            coef = resample[k];
            *newptr = (oldptr < limit)   ?
              (oldptr[1]*coef[1]+ oldptr[2]*coef[2])/(coef[1]+coef[2])  :
                 newptr[-1];    /* shachpel last pixel */
          }
      }

}

/* then in y */
  cols = newcols;
  for (i=0; i < mahzor; i++)
    advance[i]*=cols;
  free((char *)oldpic);
  oldpic = newpic;
  newpic = (unsigned char *)malloc((unsigned)(newrows*cols));

for (i=0; i < cols; i++)
    {
      limit = oldpic+i, oldptr = limit-cols, newptr = newpic+i;
      j = k = 0;

while(oldptr < limit)      /* top shul */
        {
          coef = resample[k];
          *newptr = (oldptr[c1]*coef[1]+ oldptr[c2]*coef[2])/(coef[1]+coef[2]);
          j++, k = next_ind[k], oldptr += advance[k], newptr+=cols;
        } for (limit += cols*(rows-3); oldptr < limit; /* main job */
           j++, k=next_ind[k], oldptr+=advance[k], newptr+=cols)
        {
          coef = resample[k];
          tmp = oldptr[0]*coef[0] + oldptr[c1]*coef[1] +
            oldptr[c2]*coef[2] + oldptr[c3]*coef[3];
          *newptr =
            tmp > (255<<8)  ?  255  : tmp < 0  ?  0  :   (tmp+128)>>8;
        } for (limit+=cols; j < newrows;  /* bottom shul */
           j++, k = next_ind[k], oldptr += advance[k], newptr+= cols)
        {
          coef = resample[k];
          *newptr = (oldptr < limit)   ?
            (oldptr[c1]*coef[1]+ oldptr[c2]*coef[2])/(coef[1]+coef[2])  :
               newptr[-cols]; /* shachpel last pixel */
        }
```

```
    } free((char *)oldpic);
  return(newpic);
}

/*********************************************************************/ get_coefficients(lut, offset)
      int lut[4];                    /* space for coefficients */
      double offset;
{
  double x;
  double alpha = -.5;                /* optimal, as claimed */
  double a, b, u,v,w;
  int extra;

a=alpha +2, b = -(alpha+3);
  u = -5*alpha, v=8*alpha, w=4*alpha;

/* lut is computed one way for 0 <=x <1 and another way for 1 <=x < 2. */
  x = offset+1;
  lut[0] = (int)(256*(((alpha*x+u)*x+v)*x -w));
  x = 2-offset;
  lut[3] = (int)(256*(((alpha*x+u)*x+v)*x -w));
  x = offset;
  lut[1] = (int)(256 * ((a*x+b)*x*x+1) + .5);
  x = 1-offset;
  lut[2] = (int)(256 * ((a*x+b)*x*x+1) + .5);

/* sum <-- 1 */
  extra = lut[0]+lut[1]+lut[2]+lut[3]-256;
  lut[1]-=extra;
}

/*********************************************************************/
/*                                                                   */
/* function - read a UBC image file. It does not use the standard UBC */
/*            interface functions, but goes directly to the file.    */
/*            It assumes a bpp (bits per pixel) value of 8.          */
/*                                                                   */
/*********************************************************************/ read_ubc_file(filename, buf, header)
      char          *filename;
      unsigned char **buf;
      char *header;                  /* header buffer */
{
  FILE  *fp;
  int   npix;

if ((fp = fopen(filename, "r")) == NULL)
    return 0;

if(fread(header, 1, 1024, fp) != 1024)         /* read header */
    return 0;

header[1024] = '\0';           /* terminate as a string */ if (!read_int_token(header, "nrows", &rows) ||
      !read_int_token(header, "ncols", &cols) ||
      !read_int_token(header, "positive", &oldres))
    return 0;
```

```
  npix = rows * cols;
  if (npix < 10)
    return 0;

if((*buf) != NULL)
    free((char *)(*buf));
  (*buf) = (unsigned char *) malloc((unsigned) npix * sizeof(unsigned char));
  if((*buf) == NULL)
    return 0;

if(npix != fread((char *) (*buf), 1, npix, fp))
    {
      free((char *)(*buf));
      fclose(fp);
      return 0;
    } fclose(fp);
  return 1;

}                               /* end of read_ubc_file() */

/**********************************************************************/
/*                                                                    */
/*      function  -  read int token from buffer                       */
/*                                                                    */
/**********************************************************************/ read_int_token(token_string, name, value)
     char *token_string;        /* string being parsed */
     char *name;                /* token name */
     int *value;                /* store value here */
{
  char *token, str[1100];
  extern char *strtok();
  (void) strcpy(str, token_string);
  token = strtok(str, " =");
  while (token != NULL && strcmp(token, name)) /* look for named token */
    token = strtok((char *) NULL, " =");

if (token != NULL)            /* found it */
    {
      *value = atoi(strtok((char *) NULL, " =")); /* read value */
      return 1;
    }
  else
    {
      *value = 0;               /* default */
      return 0;
    }
}                               /* end of read_int_token() */

/**********************************************************************/
/* This function writes modified UBC image file                       */
/**********************************************************************/ write_ubc_file( filename, buf, rows, cols)
     char *filename;
     unsigned char *buf;
     int rows, cols;
{
```

```
    FILE *fp;
    int i, cnt, npix;
    static char fields[][20] = {  /* fields to rescale */
      "top-row-leg",
      "bot-row-leg",
      "top-row-cur",
      "bot-cur",
      "tr-edge",
      "x-offs",
      "y-offs", };

if((fp = fopen(filename, "w")) == NULL)
      return 0;

npix = rows *cols;
    modify_header("nrows", rows);
    modify_header("ncols", cols);
    modify_header("positive", newres);

for (cnt = sizeof(fields)/sizeof(fields[0]) - 1; cnt > 0; cnt--)
      if (read_int_token(header, fields[cnt], &i))
        modify_header(fields[cnt], rescale_param(i));

fwrite(header, 1, 1024, fp);
    if(npix != fwrite((char *) buf, 1, npix, fp))
      return 0;

fclose(fp);                    /* close input image file */
    return 1;                      /* file read successfully */

}                                  /* end of write_ubc_file() */

/**********************************************************************/
/* Replaces numeric value of certain token by new numric value.       */
/**********************************************************************/ modify_header(token, new_value)
     char *token;                  /* token to replace */
     int new_value;                /* its new value */
{
  char *start, *p;
  char s[50];
  int cnt, cnt2;                   /* length of old/new values */ if (p = strstr(header, token))
    {
      start = p = strpbrk(p, "0123456789"); /* get to first digit of token */
      if (p-header > 1  &&  *(p-1) == '-'  &&
          (*(p-2) == ' '  ||  *(p-2) == '='))
        start--;                   /* include the minus sign */
      while (isdigit(*p)) p++;     /* get to first char after token */
      cnt = p - start;             /* len of old value */

(void) sprintf(s, "%d", new_value);
      cnt2 = strlen(s);            /* len of new value */ if (cnt == cnt2)
        (void) strncpy(start, s, cnt); /* insert new value into header */
      else
        {
          char buf[1024];
          (void) memcpy(buf, p, 1024 - (p - header));
          (void) memcpy(start, s, strlen(s));
          p = start+strlen(s);
          (void) memcpy(p, buf, 1024 - (p - header));
```

```c
      }
      return TRUE;
    }
  else
    return FALSE;
}                                       /* end of modify_header() */

/************************************************************************/
/* This function multiplies param by newres / oldres, and rounds to     */
/* proper integer value.                                                */
/************************************************************************/ rescale_param(x)
     int x;
{
  float rx = x * newres / ((float)oldres);
  x = rx > 0 ?   (rx + 0.5)   :   -(-rx + 0.5);
  return x;
}                                       /* end of rescale_param() */

/************************************************************************/ ifndef sparc
/************************************************************************/
/* returns a pointer to the first occurence of the pattern string s2 in */
/* s1. For example, if s1 is "string thing" and s2 is "ing",            */
/* strstr() returns "ing thing". If s2 does not occur in s1,            */
/* strstr() returns NULL.                                               */
/*                                                                      */
/* This function is used by non-sparc systems.                          */
/************************************************************************/ char *strstr(s1, s2)
     register char *s1, *s2;
{
  extern char *strchr();
  int n;

if (n = strlen(s2))
    while (s1 != NULL  &&  (s1 = strchr(s1, *s2)))
      if (!strncmp(s1, s2, n))
        return s1;
      else
        s1++;

return NULL;
}                                       /* end of strstr() */

/************************************************************************/
#endif
```

APPENDIX H

```
/*
   This file is used to link modules written and compiled with CC with
   programs where main() is compiled with cc.

DO NOT forget to call _main() before any other statement in main().
 */

/* this is to link in __head from libC.so for patch version of cfront */
extern "C"
{
extern struct __linkl *__head;
struct __linkl **__LinkInHead = (struct __linkl **)(& __head );
}
```

```c
/***********************************************************************/
/*                                                                     */
/*                        scan_files.c                                 */
/*                                                                     */
/***********************************************************************/

/* SCCS id string "%W%  %G%" */ include <stdio.h>
include <string.h>
#include <stdlib.h>
#include <ctype.h>
#include <scan_files.h>

/***********************************************************************/ void expand_environment_vars(char *s); // forward declaration extern "C"
{
  int getpid();
} const char * Scan_files::scan(const char *dir, const char *files)
{
  char tmp_file[1000], s[1000], separator[2], buf[201];
  Dlink_text *item;
  int real_scan;
  int at_least_one = FALSE;
  int no_dir;
  FILE *fp;

if (iter)                    // kill old iterator
    delete iter;
  iter = 0;
  while (item = list.take_head())  // clear list
    delete item;

no_dir = (dir[0] == '\0');   // empty dir argument
  (void) strcpy(separator, dir[strlen(dir)] == '/' ? "" : "/");

if (files[0] == '@')
    {                          /* treat the other chars as a file name */
      real_scan = FALSE;
      (void) sprintf(tmp_file, "%s%s%s", dir, separator, files + 1);
      expand_environment_vars(tmp_file);
      if ((fp = fopen(tmp_file, "r")) == NULL)
        return 0;
    }
  else
    {                          /* use 'ls' to scan dir */
      real_scan = TRUE;
      (void) sprintf(tmp_file, "/tmp/scan_%d", getpid()); /* unique name */
      (void) sprintf(s, "cd %s ; ls -ld %s > %s", no_dir ? "." : dir,
                     files, tmp_file);
                               /* create 'ls' command */
      expand_environment_vars(s);
      if (system(s) ||         /* directory not read into temporary file */
          (fp = fopen(tmp_file, "r")) == NULL) /* temporary file not ok */
        return 0;
    }

/* ok if got here */ while (fgets(buf, 200, fp))  /* read one more line */
    {
```

```
          buf[strlen(buf) - 1] = '\0'; /* kill the new-line char */
          list.append(new Dlink_text(buf));
          at_least_one = TRUE;
        } if (at_least_one)
        iter = new Dlist_text_iter(list);

fclose(fp);

if (real_scan)                /* file is temporary */
      {
        sprintf(s, "rm -f %s", tmp_file); /* remove temporary file */
        if (system(s))
            ;
      } return first();
}

/******************************************************************************/
/* expand any environmental variables in a given string, similar to           */
/* what the echo command does. The input string may contain several           */
/* environmental variable. The expanded string is copied on the input         */
/* string. It is the caller responsibility to provide enough space for        */
/* the expanded string.                                                       */
/******************************************************************************/ void expand_environment_vars(char *s)
{
  char expanded[500];          /* build the expanded string here */
  char tmp[40];                /* to hold a variable name */
  char *src, *dst, *var;

for (src = s, dst = expanded;  *src != '\0';  ) /* run on input string */
    {
        if (*src == '$')          /* got to an enviroment variable */
          {
            for (var = tmp, src++; *src != '/' && *src != '.' && *src != '$' &&
                 !isspace(*src) && *src != '\0'; )
              *var++ = *src++;    /* build variable name */
            *var = '\0';
            if (var = getenv(tmp)) /* environmental variable found */
              {
                strcpy(dst, var); /* copy to new string */
                dst += strlen(var);
              }
            else
              {
                sprintf(dst, "$%s", tmp);
                dst += strlen(tmp) + 1;
              }
          }
        else if (*src == '~')
          {
            char syscall[200];

for (var = tmp;  *src != '/' && *src != '$' && !isspace(*src) &&
                 *src != '\0'; )
              *var++ = *src++;    /* build variable name */
            *var = '\0';
            (void) sprintf(syscall, " csh -c \"echo %s\" ", tmp);
            (void) fscanf(popen(syscall, "r"), "%s", dst);
            dst += strlen(dst);
          }
```

```
        else
            *dst++ = *src++;        /* regular chars, just copy */
        }
    *dst = '\0';                    /* terminate new string */
    strcpy(s, expanded);            /* copy expanded string overriding s */

}                                   /* end of expand_environment_vars() */

/*******************************************************************/
```

APPENDIX J

U 010126-2

```c
/**********************************************************************/
/*                                                                    */
/*                              scan.c                                */
/*                                                                    */
/**********************************************************************/

/* SCCS id string "%W%  %G%" */ include <scan_files.h>
include <scan.h> extern "C"
{ static Scan_files scanner;

const char *scan_files(const char *dir, const char *files)
   { return (const char *) scanner.scan(dir, files); } const char *scan_first()
   { return (const char *) scanner.first(); } const char *scan_last()
   { return (const char *) scanner.last(); } const char *scan_next()
   { return (const char *) scanner.next(); } const char *scan_prev()
   { return (const char *) scanner.prev(); }

}       /* end of C code */
```

APPENDIX K        U 010126-2

```c
/**********************************************************************/
/*                                                                    */
/*                          scan_text.c                               */
/*                                                                    */
/**********************************************************************/

/* SCCS id string "%W%  %G%" */ include <scan_text.h> const char * Scan_text::first()
{
  Dlink_text *text_item;
  if (iter)
    if (text_item = iter->first())
      return (const char *) text_item->get_text();

return 0;
} const char * Scan_text::last()
{
  Dlink_text *text_item;
  if (iter)
    if (text_item = iter->last())
      return (const char *) text_item->get_text();

return 0;
} const char * Scan_text::next()
{
  Dlink_text *text_item;
  if (iter)
    if (text_item = iter->next())
      return (const char *) text_item->get_text();

return 0;
} const char * Scan_text::prev()
{
  Dlink_text *text_item;
  if (iter)
    if (text_item = iter->prev())
      return (const char *) text_item->get_text();

return 0;
}
```

APPENDIX LU 010126-2

```
/************************************************************************/
/*                                                                      */
/*                          get_option                                  */
/*                                                                      */
/************************************************************************/

/************************************************************************/
/* Get_option is a package for handling the arguments passed to main()  */
/* via the argc and argv variables. It allows testing for options       */
/* specified by the user when running a program, and getting a string   */
/* value associated with them. Options must begin with a '-' character  */
/* and may be (but do not have to be) followed by a string value. The   */
/* string value may be separated by s[aces from the flag or be          */
/* adjacent to it.                                                      */
/*                                                                      */
/* For example, in the following command:                               */
/*                                                                      */
/*          my_prog -a -b B_VALUE -cC_VALUE -d                          */
/*                                                                      */
/* the user specified four flags (a, b, c, d), two of which (b and c)   */
/* have values (B_VALUE and C_VALUE respectively).                      */
/*                                                                      */
/* The package comes in three functions:                                */
/*                                                                      */
/*     get_option_init(argc, argv);                                     */
/*        int argc;                                                     */
/*        char *argv[];                                                 */
/*                                                                      */
/*     get_option_flag(c);                                              */
/*        char c;                                                       */
/*                                                                      */
/*     char *get_option_value(c);                                       */
/*        char c;                                                       */
/*                                                                      */
/* get_option_init initializes the package, and must be called once     */
/* before calling any of the other functions.                           */
/*                                                                      */
/* get_option_flag returns 1 if the option "-c" were specified by the   */
/* user (with or without a string value), where c is its argument. It   */
/* returns 0 otherwise.                                                 */
/*                                                                      */
/* get_option_value returns a pointer to the string value associated    */
/* with the "-c" option, where c is its argument. It returns a pointer  */
/* to an empty string (not a NULL pointer!!!) if the "-c" option were   */
/* not specified, or if it was specified with no string value.          */
/************************************************************************/

/* SCCS id string */
#ifndef lint
static char sccsid[] = "@(#)options.c   1.2   4/22/91";
endif include <stdio.h>

/******** definitions ********/ ifndef FALSE
define FALSE   0
endif ifndef TRUE
define TRUE    1
#endif

/********** static arguments **********/
```

```
static short option_argc;         /* equal to main argc */
static char **option_argv;        /* equal to main argv */
static char null_string[1] = "";

/**********************************************************************/ get_option_init(argc, argv)
    int argc;                     /* arguments from main() */
    char *argv[];
{
  option_argc = argc;             /* initialize global variables */
  option_argv = argv;
}                                 /* end of get_option_init() */

/**********************************************************************/ get_option_flag(c)                /* return TRUE if option "-c" provided */
    register char c;
{
  register char **p = option_argv + 1;
  register int i;

for (i = 1 ; i < option_argc ; i++, p++) /* for all arguments */
    if ((**p == '-') && (*(*p + 1) == c))
      return TRUE;                /* option appears in arguments list */ return FALSE;                   /* not found */
}                                 /* end of get_option_flag() */

/**********************************************************************/ char *get_option_value(c)         /* return string associated with "-c" */
    register char c;
{
  register char **p = option_argv + 1;
  register int i;

for (i = 1; i < option_argc ; i++, p++) /* for all arguments */
    if ((**p == '-') && (*(*p + 1) == c))
      {
        if (*(*p + 2) == '\0')    /* there is space after the "-c" */
          {
            if ((i == option_argc - 1) || (**(p + 1) == '-'))
                                  /* last argument or next arg is new option */
              return null_string;
            else
              return *(p + 1);    /* return next argument as value */
          }
        else                      /* no space between the "-c" and the value */
          return *p + 2;
      } return null_string;             /* option "-c" not found at all */
}                                 /* end of get_option_value() */

/**********************************************************************/
```

APPENDIX M

```c
#include <stdio.h>
#include <sys/file.h>
include <pixrect/pixrect_hs.h> int read_pic(fname,image,rows,cols)
  char *fname;
  unsigned char **image;
  int *cols,*rows;
{
  int Cols,Rows;
  unsigned char *Image;

if(*fname == '\0' ||
     !( read_ubc_file(fname, &Image, &Rows, &Cols) ||
        read_pixrect(fname, &Image, &Rows, &Cols) ||
        read_optro(fname, &Image, &Rows, &Cols) ||
        read_rmx(1,fname, &Image, &Rows, &Cols) ||
        read_rmx(0,fname, &Image, &Rows, &Cols)
        ))
    return 0;

*cols = Cols;
  *rows = Rows;
  *image = Image;

return 1;
} int read_ubc_file(filename, buf, rows, cols)
     char         *filename;
     unsigned char **buf;
     int          *rows, *cols;
{
  FILE *fp;
  char header[1025];   /* header buffer */
  int  npix;

if ((fp = fopen(filename, "r")) == NULL)
    return 0;

if(fread(header, 1, 1024, fp) != 1024)  /* read header */
    {fclose(fp);return 0;} header[1024] = '\0';    /* terminate as a string */ if (!read_int_token(header, "nrows", rows) ||
      !read_int_token(header, "ncols", cols))
    {fclose(fp);return 0;} npix = *rows * *cols;
  if (npix < 10)
    {fclose(fp);return 0;}

(*buf) = (unsigned char *) malloc((unsigned) npix * sizeof(unsigned char));
  if((*buf) == NULL)
    {fclose(fp);return 0;} if(npix != fread((char *) (*buf), 1, npix, fp))
    {
      free((*buf));
      fclose(fp);
      return 0;
    }
```

```
  fclose(fp);
  return 1;
} int read_optro(filename, buf, rows, cols)
     char           *filename;
     unsigned char  **buf;
     int            *rows, *cols;
{
FILE *fp;
unsigned char head[64];

fp = fopen(filename,"r");
if(!fp)
  {
  perror(filename);
  return 0;
  } if(1!=fread(head,64,1,fp))
  {
  fclose(fp);
  return 0;
  } if( head[0]!='I' || head[1]!='M')
  {
  fclose(fp);
  return 0;
  }

*cols = head[5]<<8 | head[4];
*rows = head[7]<<8 | head[6];
if(*cols<0 || *cols > 1024 || *rows < 0 || *rows > 1024)
  {
  fclose(fp);
  return 0;
  }

*buf = (unsigned char *)malloc( (*rows)*(*cols));
if(*buf == NULL)
  {
  perror("malloc");
  return 0;
  } if(1!=fread(*buf,(*cols)*(*rows),1,fp))
  {
  fclose(fp);
  return 0;
  } return 1;
} int read_rmx(kokva,filename, buf, rows, cols)
     int kokva;
     char           *filename;
     unsigned char  **buf;
     int            *rows, *cols;
{
  unsigned char c, header[4],*mem;
  int fd,n;
  struct stat inf;

fd=open(filename,O_RDONLY);
```

```
    if(fd<0) {
      perror(filename);
      close(fd);
      return 0;
    } fstat(fd,&inf);

n=0;
    do { read(fd,&c,1); n++;  } while((!kokva && c && n<128) || (kokva && n<32));

if(!kokva && n>=128) {close(fd);return 0;} read(fd,header,4);
    n+=4;

if(!kokva) *cols=header[2]|header[3]<<8;
    else
        {
        *cols=header[0]|header[1]<<8;
        *rows=header[2]|header[3]<<8;
        } if(*cols<10 || (inf.st_size-n)%(*cols) !=0 ||
       (kokva && (inf.st_size-n)/(*cols)!=(*rows)) )
        {close(fd); return 0;}

*rows=(inf.st_size-n)/(*cols) + ((inf.st_size-n)%(*cols)>0);

*buf = (unsigned char *)malloc( (*rows)*(*cols));
    if(*buf == NULL)
        {
        perror("malloc");
        return 0;
        } read(fd,*buf,inf.st_size-n);

close(fd);
    return 1;
} static read_int_token(token_string, name, value)
      char *token_string;  /* string being parsed */
      char *name;    /* token name */
      int *value;    /* store value here */
{
  char *token, str[1100];
  extern char  *strtok();
  strcpy(str, token_string);
  token = strtok(str, " =");
  while (token != NULL && strcmp(token, name)) /* look for named token */
    token = strtok((char *) NULL, " =");

if (token != NULL)     /* found it */
     {
      *value = atoi(strtok((char *) NULL, " =")); /* read value */
      return 1;
     }
  else
     {
      *value = 0;   /* default */
      return 0;
     }
}
```

```
int read_pixrect(filename,buf,rows,cols)
     char           *filename;
     unsigned char **buf;
     int            *rows, *cols;
{
  FILE *fp;
  int skip,j,X,x,i;
  Pixrect *pr;
  unsigned char *b,*b_1,*mem,*mem_1;
  unsigned short *s,*s_1;
  static unsigned char U[2] = {0 , 255};

if(NULL == ( fp = fopen(filename,"r")))
    {
    perror(filename);
    return 0;
    } if(NULL==(pr=pr_load(fp,NULL)))
    {
    fclose(fp);
    return 0;
    } fclose(fp);

*cols = pr->pr_size.x;
  *rows = pr->pr_size.y;

if(NULL == ( mem = (unsigned char *)malloc((*rows)*(*cols)*((pr->pr_depth==24)
    {
    perror("malloc in read_pixrect()");
    return 0;
    } switch(pr->pr_depth)
    {
    case 24:
      skip = (mpr_d(pr)->md_linebytes);
      b = (unsigned char *)(mpr_d(pr)->md_image);
      for(i=0,mem_1=mem, b_1=b;i < *rows;b_1+=skip,mem_1+=3*(*cols),i++)
        for(j = 3*(*cols) - 1; j>= 0;j--)
          mem_1[j] = b_1[j];
      break;

case 8:
      skip = (mpr_d(pr)->md_linebytes);
      b = (unsigned char *)(mpr_d(pr)->md_image);
      for(i=0,mem_1=mem, b_1=b;i < *rows;b_1+=skip,mem_1+=(*cols),i++)
        for(j = (*cols) - 1; j>= 0;j--)
          mem_1[j] = b_1[j];

break;

case 1:
      skip = (mpr_d(pr)->md_linebytes)>>1;
      s = (unsigned short *)(mpr_d(pr)->md_image);
      for(i=0,mem_1=mem,s_1=s;i < *rows;s_1+=skip,mem_1+=(*cols),i++)
        for(x=j=0,X= -1;j< *cols;j++)
          {
          if(--x<0)
            {
            x = 15;
            X ++;
            }
          mem_1[j] = U[ s_1[X]>>x & 1 ];
```

```
                }
            break;

default:
            fprintf(stderr,"unknown rasterfile depth\n");
            free(mem);
            pr_destroy(pr);
            return 0;
        } pr_destroy(pr);
    *buf = mem;
    return 1;
} int write_pixrect(filename,buf,rows,cols,depth)
        char        *filename;
        unsigned char *buf;
        int         rows, cols,depth;
{
write_pixrect_internal(filename,buf,rows,cols,depth,0);
} int write_pixrect_cms(filename,buf,rows,cols,cmap_len,r,g,b)
        char        *filename;
        unsigned char *buf;
        int         rows, cols,cmap_len;
        unsigned char *r,*g,*b;
{
write_pixrect_internal(filename,buf,rows,cols,8,cmap_len,r,g,b);
} int write_pixrect_internal(filename,buf,rows,cols,depth,cmap_len,red,green,blue)
        char        *filename;
        unsigned char *buf;
        int         rows, cols,depth,cmap_len;
        unsigned char *red,*green,*blue;
{
  FILE *fp;
  int skip,j,X,x,i;
  Pixrect *pr;
  unsigned char *b,*b_1,*mem,*mem_1;
  unsigned short *s,*s_1;
  colormap_t cmap;
  unsigned char gray[256];

if(NULL ==( fp = fopen(filename,"w")))
     {
     perror(filename);
     fclose(fp);
     return 0;
     } if(NULL == (pr = mem_create(cols,rows,depth)))
     {
     perror("malloc in write_pixrect()");
     fclose(fp);
     return 0;
     } pr->pr_size.x = cols;
  pr->pr_size.y = rows;

mem = buf;
```

```
  switch(pr->pr_depth)
    {
    case 8:
      skip = (mpr_d(pr)->md_linebytes);
      b = (unsigned char *)(mpr_d(pr)->md_image);
      for(i=0,mem_l=mem,b_l=b;i < rows;b_l+=skip,mem_l+=(cols),i++)
        for(j=0;j< cols;j++)
          b_l[j] = mem_l[j];

cmap.type = RMT_EQUAL_RGB;
      if(cmap_len)
        {
        cmap.length = cmap_len;
        cmap.map[0] = red;
        cmap.map[1] = green;
        cmap.map[2] = blue;
        }
      else
        {
        cmap.length = 256;
        cmap.map[0] = cmap.map[1] = cmap.map[2] = gray;
        for(i=0;i<256;i++) gray[i] = i;
        } break;

case 1:
      skip = (mpr_d(pr)->md_linebytes)>>1;
      s = (unsigned short *)(mpr_d(pr)->md_image);
      for(i=0,mem_l=mem,s_l=s;i < rows;s_l+=skip,mem_l+=(cols),i++)
        for(x=j=0,X= -1;j< cols;j++)
          {
          if(--x<0)
            {
            x = 15;
            X ++;
            s_l[X] = 0;
            }
          if(mem_l[j]) s_l[X] |= 1<<x;
          } break;

default:
      fprintf(stderr,"unknown rasterfile depth\n");
      pr_destroy(pr);
      fclose(fp);
      return 0;
    } if(PIX_ERR==
    pr_dump (pr,fp, (depth==1)?(colormap_t *)NULL:&cmap, RT_BYTE_ENCODED, 0))
    {
    perror("pr_dump");
    fclose(fp);
    return 0;
    }
  fclose(fp);

pr_destroy(pr);
  fclose(fp);
  return 1;
} write_ubc_file( filename, buf, rows, cols)
     char *filename;
```

```
      unsigned char *buf;
      int   rows, cols;
{
  FILE *fp;
  char header[1025];
  int npix = rows*cols;

if((fp = fopen(filename, "w")) == NULL)
    return 0;

memset(header, 0, 1024);  /* clear header */
  sprintf(header, "Imagefile version-2: nrows = %d ncols = %d bpp = 8 signed = 0
  fwrite(header, 1, 1024, fp);

if(npix != fwrite((char *) buf, 1, npix, fp))
    {fclose(fp);return 0;} fclose(fp);    /* close input image file */
  return 1;      /* file read successfully */

}
```

U 010126-2
APPENDIX N

```
/*
  wf/src/infra/corel    @(#)corel.h     1.18 91/03/19
*/
#define GOOD_GRAB 1234
#ifndef grab_DEFINED
define grab_DEFINED define VGAPlusXSize    800L
define VGAPlusYSize    600L define RS170XSize      512L
define RS170YSize      480L int init_maxvideo20 () ;
int prep_grab () ;
int grab_continuous () ;
int grab_oneshot () ;
int display_pipe_VGA () ;
void load_grab_param();

#endif
```

APPENDIX O

```
#ifndef IMIO_DEFINED
#define IMIO_DEFINED

/*
        @(#)imio.h      1.4 93/12/01
*/

/*
 * Include the old "ohi_package.h" here.
 * Temporary!! - delete unnecessary types and consts.
 */ ifndef u_char
define u_char unsigned char
endif define ohi_version "x.00"

/* ************** package limites ********** */
#define     ohi_entry_text_len    256
#define     ohi_max_points_per_polygon 20
#define     ohi_max_rect_fill       4
#define     max_ascii_file_windows  4
#define     ohi_name_len           30
/********* error code ******************* */ define     ohi_err                 -1

/* **** types of entries in form ********** */ define     ohi_text        0
define     ohi_int         1
#define     ohi_choice      2
#define     ohi_float       3
#define     ohi_msg         4
#define     ohi_toggle      5
#define     ohi_slider      6
#define     ohi_button      7

/* **** types of drawing op codes  ********** */ define     ohi_set_op          0
define     ohi_clr_op          1
#define     ohi_cmp_op          2
#define     ohi_src_op          3
#define     ohi_src_xor_dst     4
#define     ohi_src_or_dst      5
#define     ohi_not_src_op      6

/* ****** line style ****************************/
#define     solid       0
#define     dashed      1
#define     dotted      2

/* ****** text direction ***********************/
#define     ohi_text_to_left    0
#define     ohi_text_to_right   1
#define     ohi_text_up         2
#define     ohi_text_down       3
#define     ohi_text_centered   4

/* ***** drag modes  ***************************/
```

```
#define ohi_no_drag     0
#define ohi_rect_drag   1
#define ohi_diag_drag   2

/* ****** ohi win type   *******************************/
#define ohi_frame_win          0
#define ohi_canvas_win         1
#define ohi_form_win           2
#define ohi_static_menu_win    3
#define ohi_tsw_win            4

/* ****** status of buttons  ****************/
#define ohi_button_ready       0
#define ohi_button_pushed      1
#define ohi_button_inactive    2
#define ohi_button_busy        3

/*************** ERROR CODES *******************/
#define IMIO_FILE_NOT_EXIST   -2
#define IMIO_BAD_FILE_FORMAT  -3

/* ****** type for world coordinates *****************/
typedef double ohi_world_coord_t ;

/* ****** Codes of available fonts ************** */
/* OHI supports 5 fonts, tiny, small, med, big, huge */
typedef enum {
  ohi_font_tiny    =   0,
  ohi_font_small   =   1,
  ohi_font_med     =   2,
  ohi_font_big     =   3,
  ohi_font_huge    =   4
  } ohi_font_t ;
#define ohi_font_last_code  4
#define ohi_font_n_codes    5

/* ****** Codes of input events   ****************/
typedef enum { ohi_event_button_pushed = 0,   /* a button has been pushed */

/*   canvas events */ ohi_event_mouse_left     = 1,   /* left button of mouse has been pushed down or
                                     left up */
  ohi_event_mouse_middle   = 2,   /* middle button of mouse has been pushed down (
                                     middle up */
  ohi_event_mouse_right    = 3,   /* right button of mouse has been pushed down o]
                                     right up */
  ohi_event_mouse_move     = 4,   /* mouse has been moved */ ohi_event_kbd_clicked    = 5,   /* keyboard has been clicked while cursor is in ¿ ohi_event_canvas_redraw  = 6,   /* a canvas needs to be redrwan
                                     (probably because of zoom,pan,...)*/
  /* form entrys events */ ohi_event_toggle_modified=7, /* a toggle entry has been modified */ ohi_event_choice_modified=8, /* a toggle entry has been modified */ ohi_event_int_modified   =9, /* a <cr> in a int entry */
```

```
    ohi_event_float_modified =10,/* a <cr> in a int entry */ ohi_event_text_modified  =11,/* a <cr> in a int entry */ ohi_event_slider_modified=12, /* a dlider entry has been modified */

/* dummy event : for internal use of ohi */ ohi_event_none            = 13

} ohi_event_code_t ;
#define ohi_event_last_code  13
define ohi_event_n_codes    14 typedef union  {
  UINT_32    u ;
  int        ival ;
  float      fval ;
  char       *pval ;
} ohi_event_val_t, *ohi_event_val_p ;

/* **** structure of event which caused by a button ******** */ struct ohi_event_button_s {
  char    name[ohi_name_len+2] ;
  char    label[ohi_name_len+2];
  int     button_id ;
};
typedef struct ohi_event_button_s    ohi_event_button_t , *ohi_event_button_p ;

/* **** structure of event which caused by a canvas ******** */ struct ohi_event_canvas_s {
  int              canvas_id ;
  ohi_event_val_t  val ;    /* when keyboard klicked ; ascii value of key */
  int              x,y ;    /* in screen coordinates of canvas */
  ohi_world_coord_t wx,wy ; /* coordinates in world system */
  ohi_world_coord_t ww,wh ; /* width and height - relevant only when the event i:
                              <ohi_event_canvas_redraw>. In that case wx,wy,ww,\
                              defines the current world coordinates of the canvá
  BOOLEAN          pushed; /* TRUE when a mouse button is klicked */
};
typedef struct ohi_event_canvas_s    ohi_event_canvas_t , *ohi_event_canvas_p ;

/* **** structure of event which caused by an entry in a form ******** */ struct ohi_event_entry_s {
  int             form_id ;
  int             entry_id ;
  ohi_event_val_t val ;      /* new val of choice or toggle or slider or int o」
                                or text */
};
typedef struct ohi_event_entry_s     ohi_event_entry_t , *ohi_event_entry_p ;

struct ohi_event_s {
  ohi_event_code_t  code ;
  union gen_event {
    ohi_event_button_t button ;
    ohi_event_canvas_t canvas ;
    ohi_event_entry_t  entry ;
  } uevent ;
```

```
} ;
typedef struct ohi_event_s ohi_event_t, *ohi_event_p ;

/* ****** drawing attributes structure */ struct ohi_draw_attr_s {
  int        op_code ;           /* drawing op code      */
  int        line_style    ;     /* solid, dashed, dotted*/
  int        color ;
  int        width ;             /* width of line.
                                    width of frame lines of empty rect */
  int        rect_fill ;         /* rectangle filling pattern. 0=empty */
  int        text_direction;     /* ohi_text_to_right, ohi_text_to_left
                                    ohi_text_up, ohi_text_down */
  ohi_font_t text_font ;
};
typedef struct ohi_draw_attr_s    ohi_draw_attr_t , *ohi_draw_attr_p ;

/* ****** form entry structure */ struct ohi_form_entry_s {
  int      entry_type ;
  u_char   is_read_only ;              /* TRUE for read_only feilds */
  char     name[ohi_name_len+2] ;
  char     label[ohi_name_len+2];
  int      label_len ;                 /* length of space kept for label */
  int      text_len ;                  /* length of space kept for contents */
  int      color ;                     /* index of color. in the range 0-(n-1) whe1
                                          n is number of entries in the color_tablr
                                          of the form */
  char     str[ohi_entry_text_len] ;
  /*
    str should be as follows:
    case text entry :
      it contains the initial (default) text and it is used
      to return the final text.
    case int entry. :
      initial contents is not relevant. Defaualt is taken from <value>
    case float entry. :
      initial contents is not relevant. Defaualt is taken from <float_value>
    case choice or toggle entry:
      the format is "option1@option2@option3@........@last_option\n"
    case msg entry:
      the contents of the message
    case button entry:
      the name of the button
      */
  union    ifval {
    int    i ;
    float  f ;
  } value, min_value, max_value ;

int      float_precision ;  /* 1 | 2 | 3 | 4 */ int      row, column ; /* coordinates of entry */
};
typedef struct ohi_form_entry_s    ohi_form_entry_t , *ohi_form_entry_p ;

struct ohi_image_s {
  int        depth ;            /* no. of bits per pixels. Must be one of
```

```
                                      1, 8, 16, 32 */
    int         width ;          /* no. of columns in image. Must be:
                                      a multiply of 32   for depth 1
                                      a multiply of  4   for depth 8
                                      a multiply of  2   for depth 16
                                      any number         for depth 32
                                      */
    int         height ;         /* no. of rows in image */
    u_char      *image ;         /* contents of image     */
    int         n_bytes_per_row ; /* length of each row in bytes */
    int         description_length;/* length of an ascii description of the image *,
    char        *description ;   /* contents of description. Note the the descript
                                    might contain more than one string although
                                    the ohi functions which handle the description
                                    replaces eon-of-string characters with
                                    end-of-line.
                                    */
};
typedef struct ohi_image_s ohi_image_t, *ohi_image_p ;

/* rgb handling macros */ define ohi_rgb_pack(r,g,b) ( (b) | ( (g)<<8) | ( (r)<<16) )

define ohi_rgb_unpack(rgb, p2_r, p2_g, p2_b) \
                    *(p2_b)=(u_char)( (rgb)&0xff); (rgb)=(rgb)>>8 ;\
                    *(p2_g)=(u_char)( (rgb)&0xff); (rgb)=(rgb)>>8 ;\
                    *(p2_r)=(u_char)( (rgb)&0xff)

/*
 * End Of "ohi_package.h"
 */

/* Functions Declarations */ ohi_image_p  imio_load_image() ;
int          imio_save_image() ;
void         imio_destroy() ;
ohi_image_p  imio_create_image() ;
int          imio_file_query();
int          imio_retrieve_rectangle() ;

#endif
```

APPENDIX P

```c
/*
 * $Log:         fpd.c,v $
 * Revision 1.1  94/03/08  16:13:00  malcolm
 * Initial revision
 *
 */
#include <stdio.h>
#include <dos.h>
include <graphics.h> int    GraphDriver;           /* The Graphics device driver         */
int    GraphMode;             /* The Graphics mode value            */
int    MaxX, MaxY;            /* The maximum resolution of the screen */
int    MaxColors;             /* The maximum # of colors available  */
int    ErrorCode;             /* Reports any graphics errors        */
struct palettetype palette;   /* Used to read palette info          */ void initialize(void)
{
        GraphDriver = DETECT;
        ErrorCode = registerbgidriver(EGAVGA_driver);
        if( ErrorCode < 0 ){
                printf("Error:%s\n",grapherrormsg( ErrorCode ));
                exit(0);
        }
        initgraph( &GraphDriver, &GraphMode, "" );
        ErrorCode = graphresult();
        if( ErrorCode != grOk ){
          printf(" Graphics System Error: %s\n", grapherrormsg( ErrorCode ) );
          exit( 1 );
        }
        getpalette( &palette );
        MaxColors = getmaxcolor() + 1;
        MaxX = getmaxx();
        MaxY = getmaxy();
} mget_palette( int index)
{
        union REGS r;

r.h.ah = 0x10;
        r.h.al = 0x07;
        r.h.bl = index;
        int86( 0x10, &r,  &r );
        return r.h.bh;
} mset_color( int c_index, int c_red, int c_green, int c_blue)
{
        union REGS r;

r.h.ah = 0x10;
        r.h.al = 0x10;
        r.x.bx = c_index;
        r.h.dh = c_red;
        r.h.ch = c_green;
        r.h.cl = c_blue;
        int86( 0x10, &r,  &r );
} void rgb(int index, int red, int green, int blue)
{
        int c_index;
        c_index = mget_palette( index ); /* Get color register */
        mset_color( c_index, red>>2, green>>2, blue>>2 );
```

```
} void mcircle( int x, int y, int radius, int index )
{
        setcolor(index);
        circle(x,y,radius);
} void mline( int x, int y, int x2, int y2, int index )
{
        setcolor(index);
        line(x,y,x2,y2);
} void dot(int x, int y, int index)
{
        putpixel(x,y,index);
} void block(int x, int y, int dx, int dy, int index)
{
        setcolor(index);
        setfillstyle( SOLID_FILL, index );
        bar( x, y, x+dx-1, y+dy-1);
} void grid(int x, int y, int dx, int dy, int sx, int sy, int index)
{
        int px, py;

for( py = y; py < y + dy; py += sy )
                for( px = x; px < x + dx; px += sx )
                        putpixel(px,py,index);

} void text(int x, int y, char *s, int index)
{
        setcolor(index);
        outtextxy( x, y,   s );
} define EOM 13 rpc( char *s )
{
        char t[32], *p;
        char word[80];
        int cmd;
        int i,j,r,g,b,x,y,dx,dy,sx,sy;
        int rc = 0;

cmd = *s;
        p = s;
        while( *p && *p != 10 && *p != 13 ) p++;
        *p = 0;
        switch( cmd ){
                case 'b':case 'B': /* Block */
                        sscanf(s,"%s%d%d%d%d%d",t,&x,&y,&dx,&dy,&i);
                        block(x,y,dx,dy,i);
                        break;
                case 'd':case 'D': /* Dot */
                        sscanf(s,"%s%d%d%d",t,&x,&y,&i);
                        dot(x,y,i);
                        break;
                case 'c':case 'C': /* circle */
```

```
                    sscanf(s,"%s%d%d%d%d",t,&x,&y,&dx,&i);
                    mcircle(x,y,dx,i);
                    break;
            case 'g':case 'G': /* Grid */
                    sscanf(s,"%s%d%d%d%d%d%d%d",t,&x,&y,&dx,&dy,&sx,&sy,&i);
                    grid(x,y,dx,dy,sx,sy,i);
                    break;
            case 'l':case 'L': /* Line */
                    sscanf(s,"%s%d%d%d%d%d",t,&x,&y,&sx,&sy,&i);
                    mline(x,y,sx,sy,i);
                    break;
            case 't':case 'T': /* Text */
                    sscanf(s,"%s%d%d%d",t,&x,&y,&i);
                    /* Extract rest as a string */
                    for( j=0; j<4; j++ ){ /* Skip first 4 arguments */
                        while( *s && *s != ' ') s++;
                        while( *s && *s == ' ') s++;
                    }
                    text(x,y,s,i);
                    break;
            case 'r':case 'R': /* Rgb */
                    sscanf(s,"%s%d%d%d%d",t,&i,&r,&g,&b);
                    rgb(i,r,g,b);
                    break;
            default:
                    rc = -1;
                    break;
        }
        return rc;
} define MSG_LEN 256
unsigned char rcv[MSG_LEN+1];
unsigned char ack[2] = { 'A', 0 };

#define USAGE "Usage: fpd [1|2]"

endofmsg( char *s, int len )
{
        int i,fnd=0;

for( i=0, fnd=0; i<len && !fnd; s++, i++ )
                fnd = ( /* *s == 10 ||*/ *s ==13);

return fnd;
} void main(argc,argv)
int argc;
char *argv[];
{
        int port, len;

if( argc < 2 ){
                puts( USAGE );
                exit(0);
        }
        sscanf( argv[1],"%d",&port );
        port -= 1;

initialize();
        comm_init( port,5,3,0,0);
        comm_read( port, MSG_LEN, rcv );
        while( !kbhit() ){
                len = MSG_LEN - grcvsize( port );
                if( endofmsg( rcv, len ) ){
```

```
                    rcv[len] = 0;
                    rpc( rcv );
                    comm_stop(port);
                    comm_read( port, MSG_LEN, rcv );
                    comm_write( port, 1, ack );
            }
        }
        comm_stop(port);
        closegraph();
}

/* Compiled and linked with Turbo C Compiler. */
```

We claim:

1. A system for inspecting a display panel comprising a plurality of pixels, the system comprising:
   a selective pixel actuator which causes only some of the plurality of pixels to be actuated;
   a sensor for acquiring an image of a pattern which is generated on the panel; and
   an image processor operative to identify nonuniformities in the intensities of pixels of the panel,
   wherein the selective pixel actuator is operative to sequentially actuate a sequence of pixel subsets, wherein each pixel subset includes only a single pixel within each of a plurality of pixel vicinities of predetermined size within the display panel.

2. A system according to claim 1 wherein the image processor is operative to identify the intensity of each pixel of the panel.

3. A system according to claim 1 wherein the sensor is capable for simultaneously acquiring an image of substantially the entirety of a pattern which is generated on the panel.

4. A system according to claim 1 wherein the sensor is capable for acquiring an image of a pattern which is generated on the panel at a resolution which does not substantially exceed that of a standard TV camera.

5. A system according to claim 4 wherein the sensor comprises less than 1300×1000 sensing elements.

6. A system according to claim 5 wherein the sensor comprises no more than 800×500 sensing elements.

7. A system according to claim 1 wherein the display panel comprises a liquid crystal display (LCD) panel.

8. A system according to claim 1 and also comprising a fixture for holding the panel suitably for a prober which is operative to provide electrical contacts with the panel to be inspected.

9. A system according to claim 1 wherein the sensor comprises blurring apparatus operative to blur the image of the pattern.

10. A system according to claim 9 wherein the blurring apparatus comprises a mechanical displacing unit.

11. A system according to claim 9 wherein the blurring apparatus comprises optical blurring apparatus.

12. A system for inspecting a display panel comprising a plurality of pixels, the system comprising:
    a selective pixel actuator which causes only some of the plurality of pixels to be actuated;
    a sensor for acquiring an image of a pattern which is generated on the panel; and
    an image processor operative to identify nonuniformities in the intensities of pixels of the panel,
    wherein the selective pixel actuator is operative to sequentially actuate a sequence of pixel subsets including, for each display panel pixel, at least one pixel subset in which said display panel pixel is actuated and in which a pixel vicinity of predetermined size surrounding said display panel pixel is not actuated.

13. A system according to claim 12 wherein said sensor comprises a low resolution camera.

14. A system for inspecting a display panel comprising a plurality of pixels, the system comprising:
    a low resolution camera for acquiring a sequence of images of patterns which are generated on the panel;
    a selective pixel actuator which generates each of the patterns by causing only some of the plurality of pixels to be actuated, thereby to overcome the low resolution of the camera;
    an image processor operative to identify nonuniformities in the intensities of pixels of the panel; and
    a pattern blurring device operative to blur the image of the patterns acquired by the low resolution camera; and
    wherein the selective pixel actuator is operative to sequentially actuate a sequence of pixel subsets including, for each display panel pixel, at least one pixel subset in which said display panel pixel is actuated and in which a pixel vicinity of predetermined size surrounding said display panel pixel is not actuated.

* * * * *